United States Patent [19]
Haraya

[11] Patent Number: 5,838,511
[45] Date of Patent: Nov. 17, 1998

[54] STORAGE DEVICE AND RECORDING MEDIUM FORMATTING METHOD USING A PHASE SHIFT BETWEEN DATA SECTORS IN ADJACENT CYLINDERS

[75] Inventor: Keiichi Haraya, Higashine, Japan

[73] Assignee: Fujitsu Limited, Kawasaki, Japan

[21] Appl. No.: 623,919

[22] Filed: Mar. 28, 1996

[30] Foreign Application Priority Data

Jun. 19, 1995 [JP] Japan ................................. 7-151910

[51] Int. Cl.⁶ .................................................. G11B 20/12
[52] U.S. Cl. ........................................... 360/48; 360/77.08
[58] Field of Search ........................... 360/48, 49, 77.08, 360/77.02

[56] References Cited

U.S. PATENT DOCUMENTS

| | | | |
|---|---|---|---|
| 5,341,255 | 8/1994 | Starr et al. ........................... | 360/77.08 |
| 5,523,903 | 6/1996 | Hetzler et al. ........................ | 360/77.08 |
| 5,526,211 | 6/1996 | Hetzler ................................. | 360/48 X |
| 5,636,075 | 6/1997 | Nishimura et al. ..................... | 360/48 |

FOREIGN PATENT DOCUMENTS

| | | |
|---|---|---|
| 52-84708 | 7/1977 | Japan . |
| 62-250561 | 10/1987 | Japan . |
| 63-275075 | 11/1988 | Japan . |
| 2-143957 | 6/1990 | Japan . |
| 3-34164 | 2/1991 | Japan . |
| 4-146574 | 5/1991 | Japan . |
| 4-146573 | 5/1992 | Japan . |
| 5-101546 | 4/1993 | Japan . |

*Primary Examiner*—Aristotelis M. Psitos
*Assistant Examiner*—James L. Habermehl
*Attorney, Agent, or Firm*—Greer, Burns & Crain, Ltd.

[57] ABSTRACT

A predetermined number of sectors are formed on respective predetermined cylinders of a predetermined recording medium of a magnetic disk. and a magnetic head moves to and is positioned at an objective sector of an objective cylinder so that information recording and/or reproducing is performed on the objective sector of the magnetic disk through the magnetic head. Positions of all the sectors formed on the predetermined cylinders are such that a phase difference within a sector length is provided at least between adjacent cylinders.

35 Claims, 19 Drawing Sheets

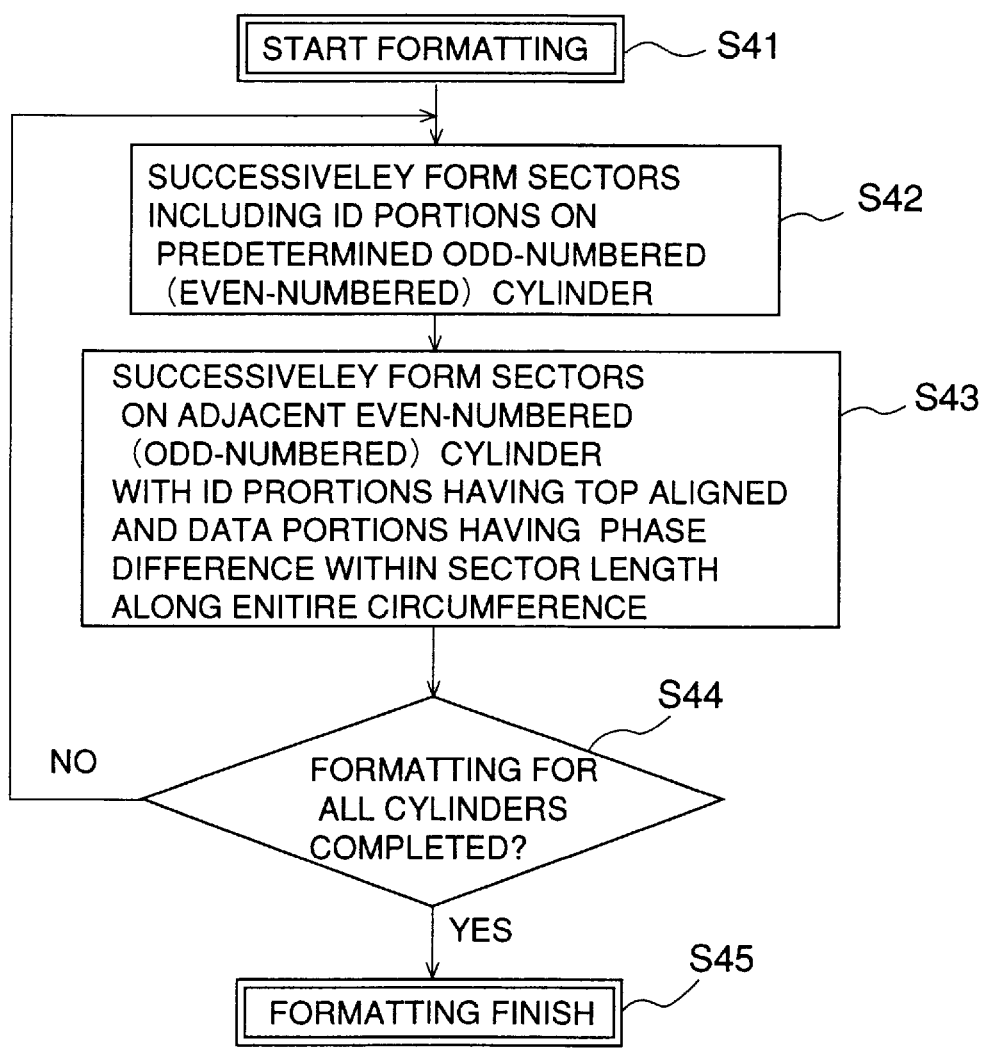

STORAGE DEVICE AND RECORDING MEDIUM FORMATTING METHOD USING A PHASE SHIFT BETWEEN DATA SECTORS IN ADJACENT CYLINDERS

BACKGROUND OF THE INVENTION

1. Field of the Invention

The present invention relates to a storage device in which a recording head is positioned at an objective cylinder of a disk recording medium and information is recorded thereto and reproduced therefrom.

Recently, in a magnetic disk device as the storage device, a higher data density is achieved and a track pitch of the disk medium as a recording medium is reduced. Due to a demand for a higher data processing rate and higher data reliability, the magnetic disk device has functions of detecting and correcting data errors. Therefore, it is necessary to prevent data destruction due to erroneous correction in a case where the recording head is off a current track. A phenomenon that a recording head is off a current track will be referred to as an off-track phenomenon, hereinafter. Such a problem is likely to occur due to the reduction of track pitch.

2. Description of the Related Art

FIG. 1 shows a structural perspective view of a magnetic disk device 11 in the related art. In this magnetic disk device 11, in an enclosure 13 on a base 12, a predetermined number of magnetic disks 15 are rotatably and supportably connected to a spindle 14a of a spindle mechanism 14.

In an actuator 16, a predetermined number of arms 19 are supportably connected to a rotation shaft 20. Each of the predetermined number of arms 19 has a supporting spring mechanism 18 which has a magnetic head 17 mounted thereon at the top thereof. A voice coil motor (VCM) 21 acting as driving means is provided at an end of the arms 19 opposite to an end at which the magnetic heads 17 are provided. The VCM 21 is provided with a voice coil 21a and a magnet 21b.

The VCM 21 has a printed-circuit board 22 connected thereto via an FPC (Flexible Printed-Circuit Board) 23. Head ICs 22a are mounted on the printed-circuit board 22.

A cover 25 is mounted on the enclosure 13 via a sealing member 24.

In the magnetic disk device 11, it is required to perform a seeking control for correctly positioning the magnetic heads 17 on a predetermined cylinder of the magnetic disks 15. For this purpose, the seeking control of the magnetic heads 17 is performed by a closed-loop servo control in which servo information previously recorded on the magnetic disks 15 is read from the magnetic disks 15.

This servo control is performed either in a servo-surface servo manner or in a data-surface servo manner. In the servo-surface servo manner, a special servo surface is provided in the magnetic disks 15 and the servo information is recorded on the servo surface. In the data-surface servo manner, the servo information is recorded on a data surface of the magnetic disks 15. The servo information is recorded on the data surface in the data-surface servo manner as the servo data is transferred to a magnetic head via a servo track writer previously connected to the head. In the recent servo-surface servo manner, the servo information is recorded not only on the special servo surface but also on the data surface.

Sector formatting of the magnetic disks 15 in the data-surface servo manner in the related art will now be described. FIG. 2A shows a general plan view of the magnetic disks 15. A predetermined number of sets of servo information 26 are previously recorded on the magnetic disks 15 radially from the center thereof with a uniform span for each cylinder. Data regions 27 are provided between the sets of servo information (servo frames) 26.

In the data regions 27, as shown in FIG. 2B, sectors 28 are provided for each cylinder by formatting. Each sector 28 includes an ID portion 28a, a data portion 28b and an ECC (Error Correction Code) portion 28c. A sort of information which is used for recording and reproducing information such as user data is previously recorded in the ID portion 28a. The information such as user data is recorded on the data portion 28b. An ECC is previously recorded in the ECC portion 28c. Recently, due to the demand for a higher recording density, the ID portion 28a may be omitted.

On the ID portion 28a, a head number, a track number, flag information, and a CRC are sequentially recorded using the servo frame as a reference. On the data portion 28b, PLO, SB, a data recording portion, an ECC, and a WRR are recorded. A predetermined gap is provided between the ID portion 28a and data portion 28b as shown in FIG. 2B.

The sector formatting is performed in a manner in which format information is transferred from a formatter, that is, a hard disk controller (HDC) of the magnetic disk device, and is recorded on the magnetic disks 15 when a write gate is opened at a predetermined clock timing.

The sectors 28 are recorded by the formatting on all the surfaces of the cylinders of the magnetic disks 15 at the same phases in reference to indexes or a signal indicating sector positions. In a case where a uniform recording density manner is used, a predetermined number of zones are defined in the magnetic disks as a radius from the center increases. In each zone, the sectors 28 are recorded with the same phases. Broken lines indicated within a data region 27 shown in FIG. 2A represent top positions of respective sectors. If a 3.5-inch magnetic disk device is assumed, for example, 60 through 100 sectors and 64 ($2^n$) servo frames are provided for a cylinder.

In the magnetic disks, sectors of different cylinders having the same phases as each other are formed. When a magnetic head moves to an objective sector on a different cylinder of a rotating disk, time is required for the disk to rotate a full turn and then further rotate until the magnetic head reaches the objective sector of the different cylinder. In order to reduce the time, head data reading start timing control is performed so that an appropriate time difference is provided between a time the magnetic head finishes reading data from a sector on a cylinder and a time the magnetic head starts reading data from a sector on an adjacent cylinder. The appropriate time difference corresponds to a time required for the disk to rotate until the magnetic head reaches a phase of the objective sector on the different cylinder. However, phases of sectors on adjacent cylinders are not intentionally made to be different. Accordingly, there is a possibility that phases of sectors on adjacent cylinders are the same as each other.

If phases of sectors on adjacent cylinders are the same as each other and a dead space between the adjacent cylinders is reduced for the purpose of increasing recording density, data of a sector on a different cylinder may be erroneously read due to the off-track phenomenon.

In the servo control according to the servo-surface servo manner, it is possible to immediately detect the off-track phenomenon. Therefore, in this case, when the off-track phenomenon is detected, data reading is discontinued and an appropriate error recovery operation such as a retrial operation can be performed. However, in the servo control according to the data-surface servo manner, the off-track phenomenon may not be immediately detected depending on timing of the off-track phenomenon occurrence. In the servo control according to the data-surface servo manner, a time, depending on a current position of the magnetic head on the magnetic disk, is required for the magnetic head to read a position at which servo information is recorded. Therefore, if a magnetic head moves to an adjacent cylinder due to the off-track phenomenon, an erroneous data reading due to the magnetic head moving to the adjacent cylinder is continued for the time.

However, the magnetic disk device 11 is provided with an error correction function. Due to the demand for a higher data processing rate, the magnetic disk device 11 automatically performs error detection and correction, and transfers correct data to a host computer, in parallel with data reading. A reading error is likely to occur in a case of the off-track phenomenon occurrence, and this error correction function is used for automatically correcting the reading error.

The off-track phenomenon may occur, while a magnetic head is reading data from a magnetic disk, due to an external mechanical shock, shaking, an electrical noise, or the like. The off-track phenomenon may cause the magnetic head to move to an adjacent cylinder as mentioned above. In this case, because a distance between adjacent cylinders is very short due to the demand for higher data recording density, there is a case where data is continuously read from the magnetic disk without read clock-pulse synchronization cancellation. In this case, after one sector of data is read from the adjacent cylinder, a reading error due to the off-track phenomenon is detected through the error correction function. If the detected reading error is out of an error correctable range of the error correction function, a retrial such as re-data reading may be performed.

However, if a difference between data written in an objective sector on an objective cylinder and data written in a sector on the adjacent cylinder is within the error correctable range of the error correction function, an erroneous error correction is performed because the error correction function cannot determine that the current accessing sector is different from the objective sector. As a result, data destruction may occur and may degrade data reliability.

SUMMARY OF THE INVENTION

An object of the present invention, made in consideration of the above-described problem, is to provide a storage device in which data destruction due to an erroneous error correction in a case of an off-track phenomenon occurrence is prevented from occurring and thereby data reliability is improved.

FIGS. 3A and 3B show a general concept of the present invention. FIG. 3A shows a magnetic disk 31 as a recording medium used in a storage device which performs information recording and reproducing. The magnetic disk 31 has, as shown in FIG. 3B, a predetermined number of sectors 32 formed on respective predetermined cylinders of the disk 31 with predetermined phases. Positions of all the sectors 32 formed on the predetermined cylinders of disk 31 are such that a phase difference is provided at least between sectors 32 formed on adjacent cylinders n and n+1. The phase difference is shorter than any sector lengths of the sectors 32.

Each of the sectors 32 may include a data portion in which information such as user data to be stored is recorded or may include the data portion and an ID portion in which a sort of information which is used for recording the information such as user data in the data portion is previously recorded.

The sector lengths of the sectors 32 formed on the respective cylinders may be equal to each other. Further, a predetermined number of servo regions in which servo information is recorded may be formed on the magnetic disk 31. The phase difference may be provided between each sector formed on odd-numbered cylinders (first, third, fifth, seventh, . . . cylinders) and each sector formed on even-numbered cylinders (second, fourth, sixth, eighth, . . . cylinders).

The sectors 32 may include a sector which is split by a servo region of the servo regions. In this case, a gap between the servo region and the top of the split sector on an odd-numbered cylinder may be either different from or equal to a gap between the servo region and the beginning of the split sector on an even-numbered cylinder.

In each sector, the ID portion may be distant from the data portion by a predetermined number of bytes. In this case, the phase difference may be provided between the data portions of sectors on adjacent cylinders.

The sectors 32 may include a sector in which the data portion is split by a servo region of the servo regions. In this case, a gap between the servo region and the beginning of the split data portion on an odd-numbered cylinder may be either different from or equal to a gap between the servo region and the top of the split data portion on an even-numbered cylinder.

A storage device according to the present invention uses a predetermined number of recording media on which a predetermined number of sectors are formed for each cylinder of the recording media. The storage device records information in and reproduces information from the recording media as a recording head is caused to move to and is positioned at an objective sector on an objective cylinder of the recording media. A predetermined number of servo regions in which servo information is recorded are formed on the recording media. A phase difference is provided at least between a sector formed on a predetermined cylinder and a sector on an adjacent cylinder. The phase difference is either a forward one or a rearward one and has a length corresponding to a predetermined number of the servo region spans.

The phase difference may be provided between each sector formed on odd-numbered cylinders and each sector formed on even-numbered cylinders.

The phase difference may be provided between sectors on any different cylinders.

Another storage device according to the present invention uses a recording medium on which a predetermined number of sectors are formed for each cylinder of the recording medium. The storage device records information in and reproduces information from the recording medium as a recording head is caused to move to and is positioned at an objective sector on an objective cylinder of the recording medium. A phase difference is provided sectors formed on any different cylinders. The phase difference is either a forward one or a rearward one and has a length within a sector length of each of the sectors.

Each of the sectors may include the data portion in which information such as user data to be stored is recorded or may include the data portion and an ID portion in which a sort of information which is used for recording the information such as user data in the data portion is previously recorded.

In a formatting method according to the present invention, a formatting occurs by which a predetermined number of sectors are formed on each cylinder of a recording medium.

The method includes the steps of:
a) successively forming the predetermined number of sectors on a predetermined cylinder;
b) successively forming the predetermined number of sectors on an adjacent cylinder with a phase difference within a sector length of each of the sectors from the sectors formed in said step a) respectively; and
c) successively forming the predetermined number of sectors on all the other cylinders so that a phase difference within a sector length of each of the sectors is provided between sectors in any adjacent cylinders.

In this method, in each sector, an ID portion in which a sort of information which is used for recording information such as user data to be stored is recorded may be distant from a data portion in which the information such as user data to be stored is recorded. In this case, the phase difference may be provided at least between the data portions of sectors on adjacent cylinders.

In this method, the cylinders may be classified into odd-numbered cylinders and even-numbered cylinders, the odd-numbered cylinders being adjacent to the even-numbered cylinders respectively. The top of each odd-numbered cylinder has the same phase as that of the beginning of any other odd-numbered cylinder. Similarly, the beginning of each even-numbered cylinder has the same phase as that of the beginning of any other even-numbered cylinder.

In this method, each phase difference may be either a forward one or a rearward one.

In another formatting method according to the present invention, a formatting occurs by which a predetermined number of sectors are formed on each cylinder of a recording medium. Further, in the formatting, a predetermined number of servo regions in which servo information is recorded are formed. The method includes the steps of:
a) successively forming the predetermined number of sectors on a predetermined cylinder;
b) successively forming the predetermined number of sectors on an adjacent cylinder with a phase difference of a predetermined number of the servo region spans from the sectors formed in said step a) respectively; and
c) successively forming the predetermined number of sectors on all the other cylinders so that a phase difference of a predetermined number of servo region spans is provided between sectors in any adjacent cylinders.

In this method, the cylinders may be classified into odd-numbered cylinders and even-numbered cylinders, the odd-numbered cylinders being adjacent to the even-numbered cylinders respectively. The beginning of each odd-numbered cylinder has the same phase as that of the beginning of any other odd-numbered cylinder. Similarly, the top of each even-numbered cylinder has the same phase as that of the beginning of any other even-numbered cylinder.

In this method, each phase difference may be either a forward one or a rearward one.

By providing a phase difference at least between sectors formed on adjacent cylinders, if the off-track phenomenon occurs and thereby a recording head is at an adjacent cylinder during data reading from a recording medium, the corresponding phase difference is present between data read before and after the off-track phenomenon occurrence. This phase difference present between data read before and after the off-track phenomenon occurrence has a sector length which cannot be corrected in an error correction function such as that described above. Thereby, a read error can be surely detected and data destruction resulting from erroneous error correction can be effectively prevented. As a result, it is possible to improve data reliability.

In the case where the servo region splits the sector, either a gap between a servo region and an adjacent sector split on a cylinder is made to be different from that on an adjacent cylinder or a phase difference is provided between the beginning of a sector on a cylinder and that on an adjacent cylinder as mentioned above according to the present invention. Thereby, by the same reason mentioned above, a read error can be surely detected and data destruction resulting from erroneous error correction can be effectively prevented. As a result, it is possible to improve data reliability.

In the case where each sector includes the ID portion and data portion and the two portions are distant from each other, the data portion is appropriately spit by the servo region, and either a gap between a servo region and the adjacent data portion split on a cylinder is made to be different from that on an adjacent cylinder or a phase difference is provided between the beginning of the data region on a cylinder and that on an adjacent cylinder as mentioned above according to the present invention. Thereby, by the same reason mentioned above, a read error can be surely detected and data destruction resulting from erroneous error correction can be effectively prevented. As a result, it is possible to improve data reliability.

Other objects and further features of the present invention will become more apparent from the following detailed description when read in conjunction with the accompanying drawings.

BRIEF DESCRIPTION OF THE DRAWINGS

FIG. 13 shows a flowchart of disk formatting for the formats shown in FIGS. 12A, 12B and 12C;

DESCRIPTION OF THE PREFERRED EMBODIMENTS

Figure 4:
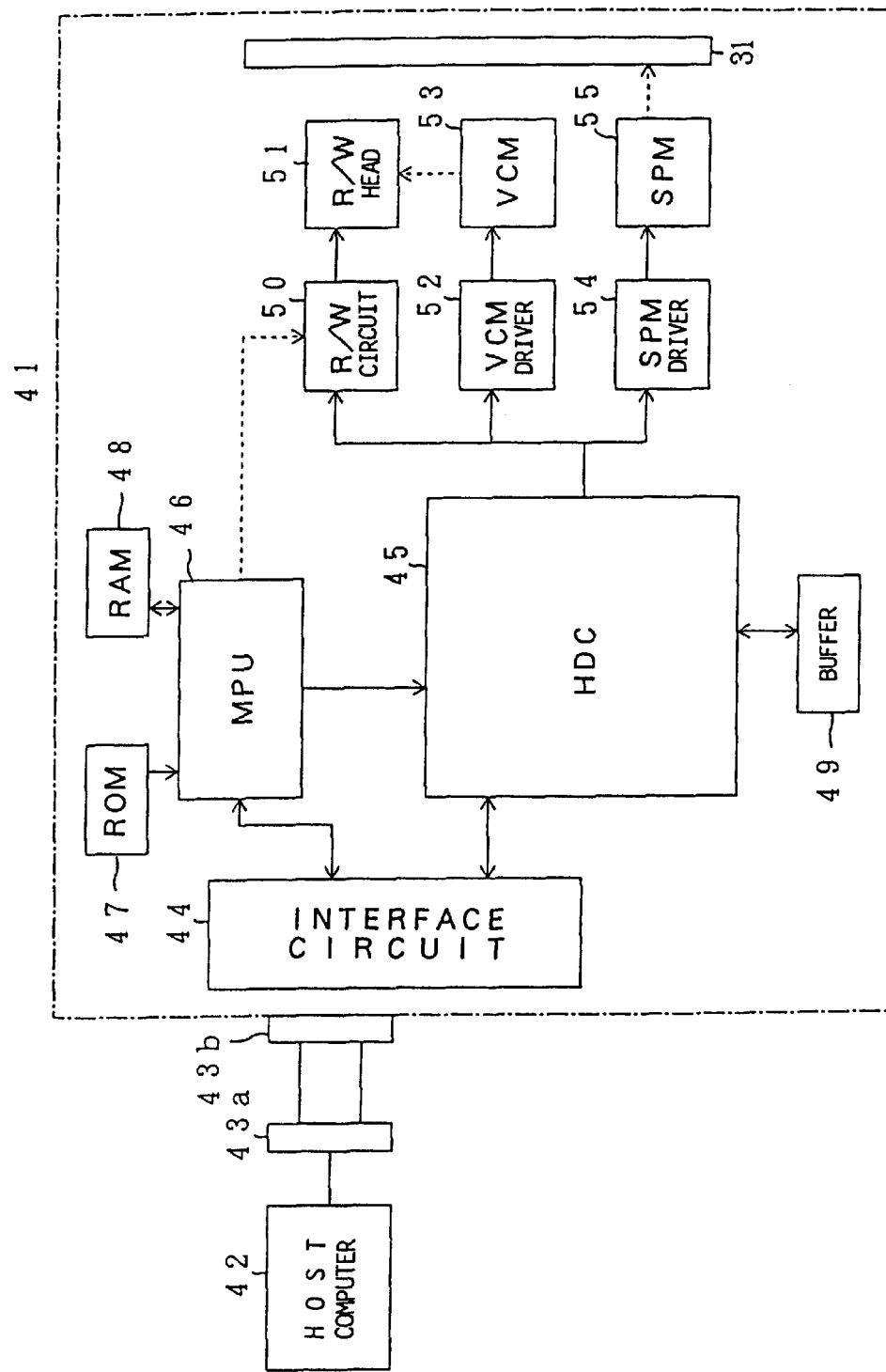
FIG. 4 shows a block diagram of a first embodiment of the present invention.

FIG. 4 shows a magnetic disk device 41 acting as a storage device in the first embodiment of the present invention. The magnetic disk device 41 is connected to a host computer 42 as a higher-order device via an interface device (SCSI device) 43a and 43b.

In the magnetic disk device 41, a HDC (Hard Disk Controller) 45 is connected to an interface circuit 44 and data including user data is input to the HDC circuit 45 from the host computer 42 via the interface circuit 44.

An MPU (MicroProcessor Unit) 46 is connected to the interface circuit 44 and is provided with a ROM (Read-Only Memory) 47 and a RAM (Random Access Memory) 48. Various commands such as a read instruction and a write instruction are input to the MPU 46 from the host computer 42 via the interface circuit 44.

The HDC 45 is provided with a buffer 49 which temporarily stores therein user data input to the HDC 45. The temporarily stored user data is read out and output from the buffer 49 during disk data reading and is supplied to a R/W (Read/Write) head 51 via a R/W circuit 50. Not shown in the figure, the R/W circuit 50 is provided with a demodulating circuit, a modulating circuit, an A/D converting circuit and a D/A converting circuit, and a write gate signal and a read gate signal are supplied to the R/W circuit 50 from the MPU 46.

The HDC 45 drives a VCM (Voice Coil Motor) 53 via a VCM driver 52, and the VCM 53 causes the R/W head 51 to perform seeking and thus move in a radial direction of a magnetic disk 31 as a recording medium.

The HDC 45 also drives an SPM (Spindle Motor) 55 via an SPM driver 54, and the SPM 55 rotates the magnetic disk 31 at a fixed rotation speed.

Figure 1:
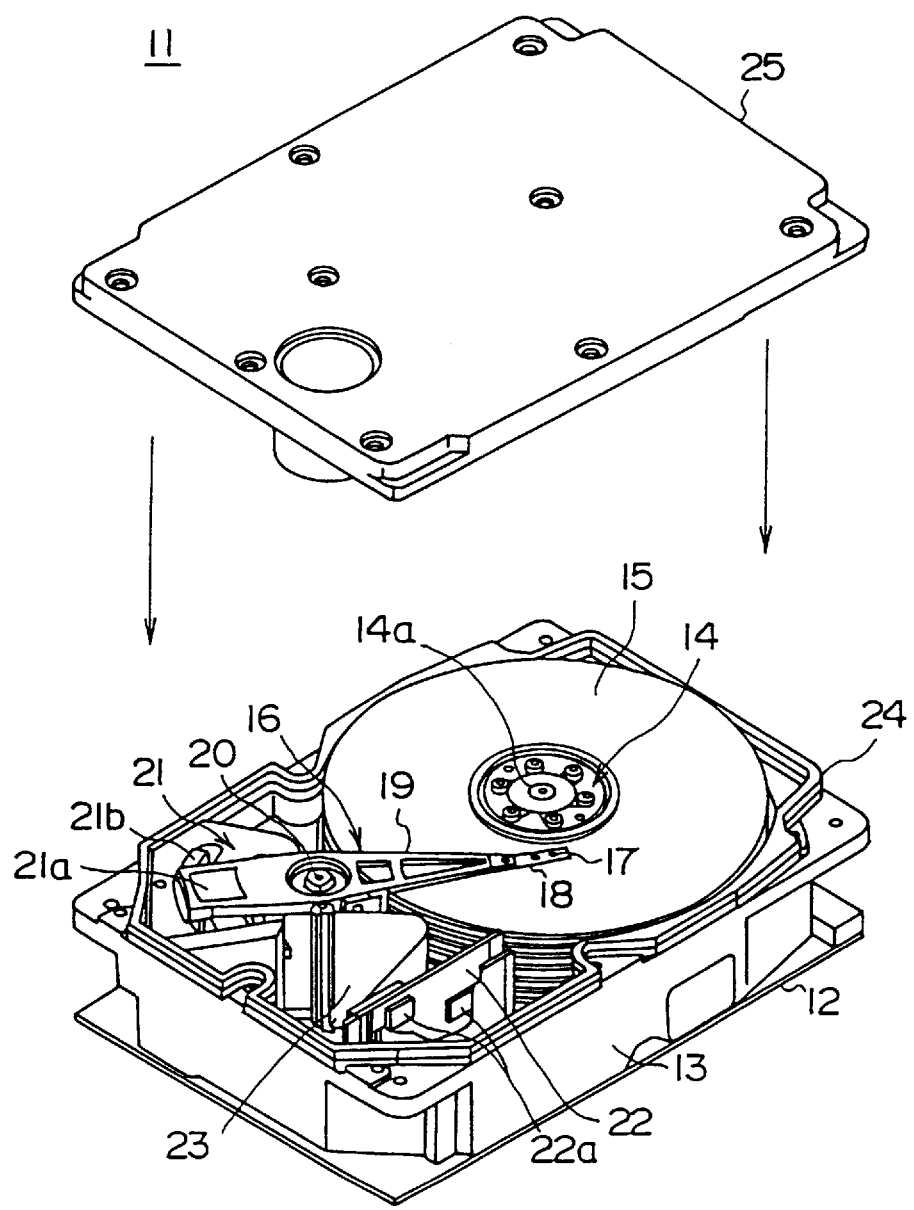
FIG. 1 shows a perspective view of a magnetic disk device in the related art.
Figure 2A:
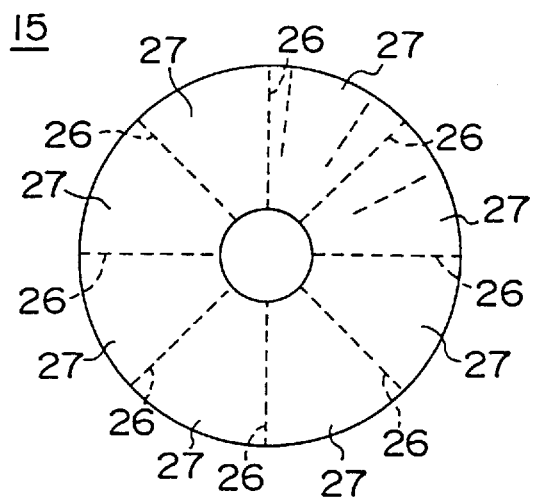
FIGS. 2A and 2B illustrate sector formatting of a magnetic disk in the related art.
Figure 2B:
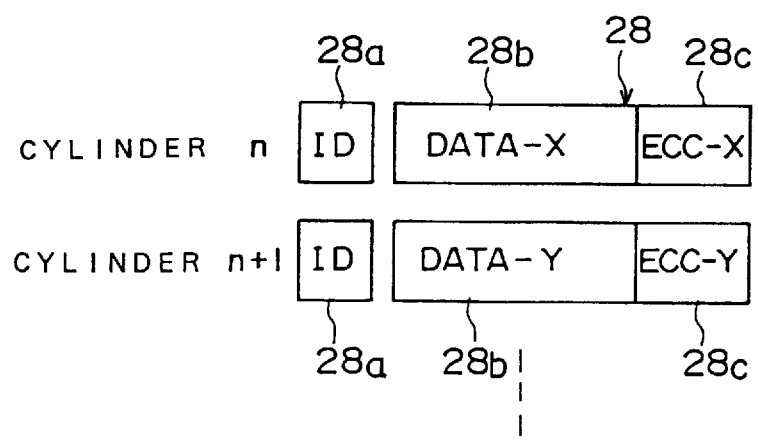
Figure 3A:
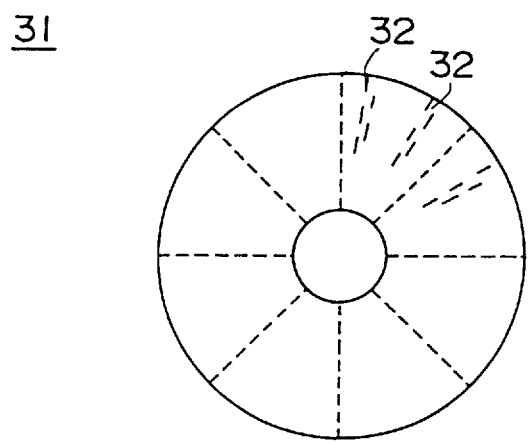
FIGS. 3A and 3B illustrate a general concept of the present invention.
Figure 3B:
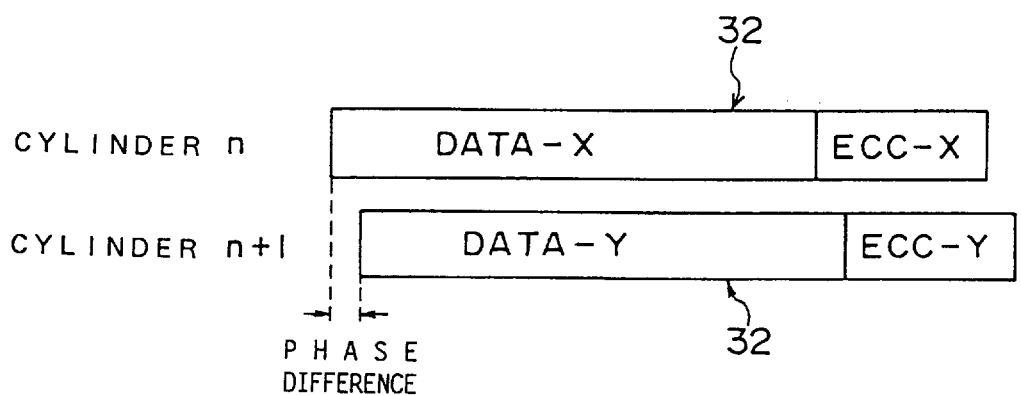

A constructional mechanism of the magnetic disk 41 is similar to that shown in FIG. 1 and therefore a description thereof will be omitted.

Figure 5A:
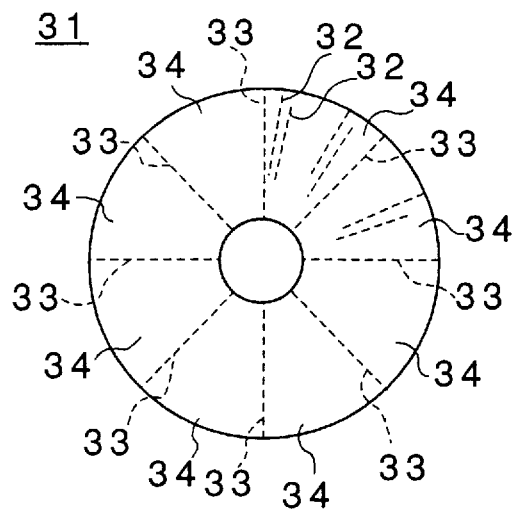
FIGS. 5A and 5B illustrate a format in a magnetic disk shown in FIG. 4.
Figure 5B:
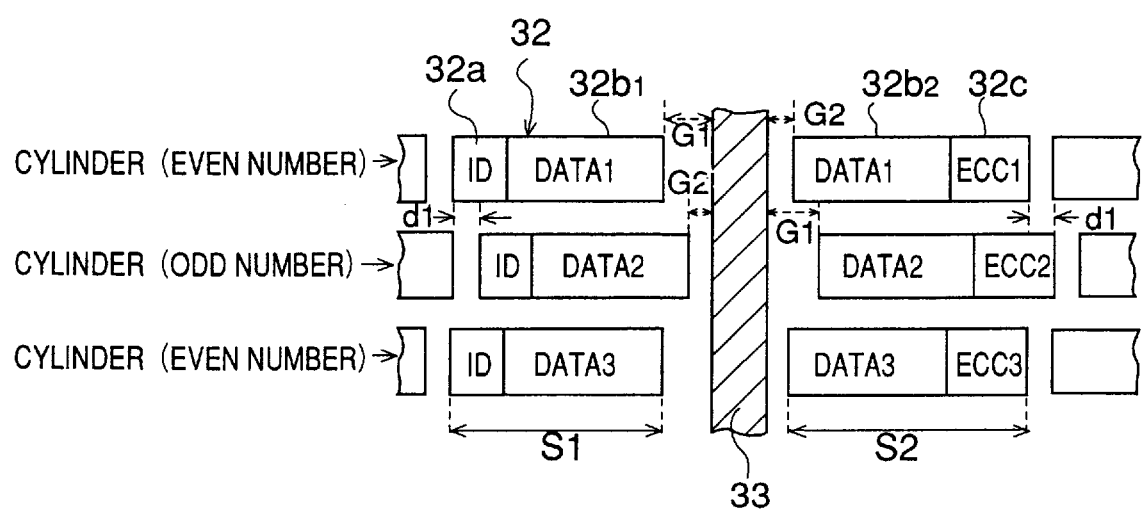

FIG. 5A shows a general arrangement of a format in the magnetic disk 31 in a plan view, and FIG. 5B illustrates a partial magnified view of the format and shows sectors formed on predetermined cylinders of the magnetic disk 31. In the figures and hereinafter, the disk format and disk formatting will be described for a single disk although the magnetic disk device 41 contains a plurality of magnetic disks as described with reference to FIG. 1. The format shown in the figures is one for the above-described data-surface servo manner servo control. A predetermined number of servo regions 33 are formed in manner in which each servo region extends in a radial direction from the center of the disk 31 and spans between the servo regions are uniform. Servo information is recorded in the servo regions and is used for the data-surface servo manner servo control. A data region 34 is provided in a space (servo frame) between each adjacent servo regions 33 and sectors 32 are formed in data regions 34. On the magnetic disk 31, a predetermined number of cylinders are formed in a concentric manner. On each cylinder, a predetermined number of sectors are formed.

Each sector 32 includes an ID portion 32a, a data portion 32b and an ECC portion 32c. A sort of information, which is used for recording and reproducing information such as user data in and from the data portion 32b, is previously recorded in the ID portion 32a. The information such as user data is recorded in the data portion 32b. A sort of information (7 bytes or 11 bytes) which is used for performing an ECC correction is previously recorded in the ECC portion 32c. In FIG. 5B, it is shown that a data portion 32b of a sector is split into two splits $32b_1$ and $32b_2$ by a servo region 33.

The cylinders on the magnetic disk 31 are classified into odd-numbered cylinders and even-numbered cylinders, the odd-numbered cylinders are adjacent to even-numbered cylinders respectively as shown in FIG. 5B. Byte lengths (sector lengths) are the same among all the sectors formed, and each byte length is S1+S2 as shown in FIG. 5B. As shown in the figure, a position of a sector 32 formed on each odd-numbered cylinder is different from a position of a sector 32 formed on each even-numbered cylinder by a phase difference d1. For example, in a case where the magnetic disk 31 is a 3.5-inch disk and a fixed rotation speed for the disk 31 is 3600 rpm, a time required for scanning one byte of data is 250 ns. In this case, if the phase difference is 2 bytes, the phase difference is formed in the disk formatting as a result of delaying a write gate open timing by 500 ns.

The sectors 32 formed on the odd-numbered cylinders have the same phase as each other, and the sectors 32 formed on the even-numbered cylinders have the same phase as each other. With reference to FIG. 5B, along the entire circumference of each cylinder, the phase difference d1 is present between each of all the sectors including a sector (containing DATA2 and ECC2) on each odd-numbered cylinder and a respective one of all the sectors including a sector (containing DATA1 and ECC1, or DATA3 and ECC3) on any adjacent even-numbered cylinder.

As mentioned above, each of the data portions 32b of the sectors 32 is split by the servo region 33 in FIG. 5B. As shown in the figure, a front gap G1 between the split data portion DATA1 or DATA3 and the servo region 33 on each even-numbered cylinder is different from a front gap G2 between the split data portion DATA2 and the servo region 33 on each odd-numbered cylinder. Similarly, a rear gap G2 between the split data portion DATA1 or DATA3 and the servo region 33 on each even-numbered cylinder is different from a rear gap G1 between the split data portion DATA2 and the servo region 33 on each odd-numbered cylinder. As a result, the phase difference d1 is provided between the rear end of the ECC portion ECC2 of the sector 32 on the odd-numbered cylinder and rear end of the ECC portion ECC1 or ECC3 of the sector 32 on the even-numbered cylinder, as shown in FIG. 5B.

In FIG. 5B, it is not necessary that the gap length G1 between the front split data portion $32b_1$ (DATA1) on the even-numbered cylinder and the servo region 33 is the same as the gap length G1 between the servo region 33 and the rear split data portion $32b_2$ (DATA2) on the odd-numbered cylinder. Similarly, it is not necessary that the gap length G2 between the servo region 33 and the rear split data portion $32b_2$ (DATA1) on the even-numbered cylinder and the servo region 33 is the same as the gap length G2 between the front split data portion $32b_1$ (DATA2) on the odd-numbered cylinder and the servo region 33.

With reference to the flowchart shown in FIG. 6, disk formatting for the format in the magnetic disk 31 shown in FIGS. 5A and 5B will now be described. The disk formatting is performed by means called a formatter, not shown in the figure, under control by the MPU 46 through the R/W head 51.

Figure 6:
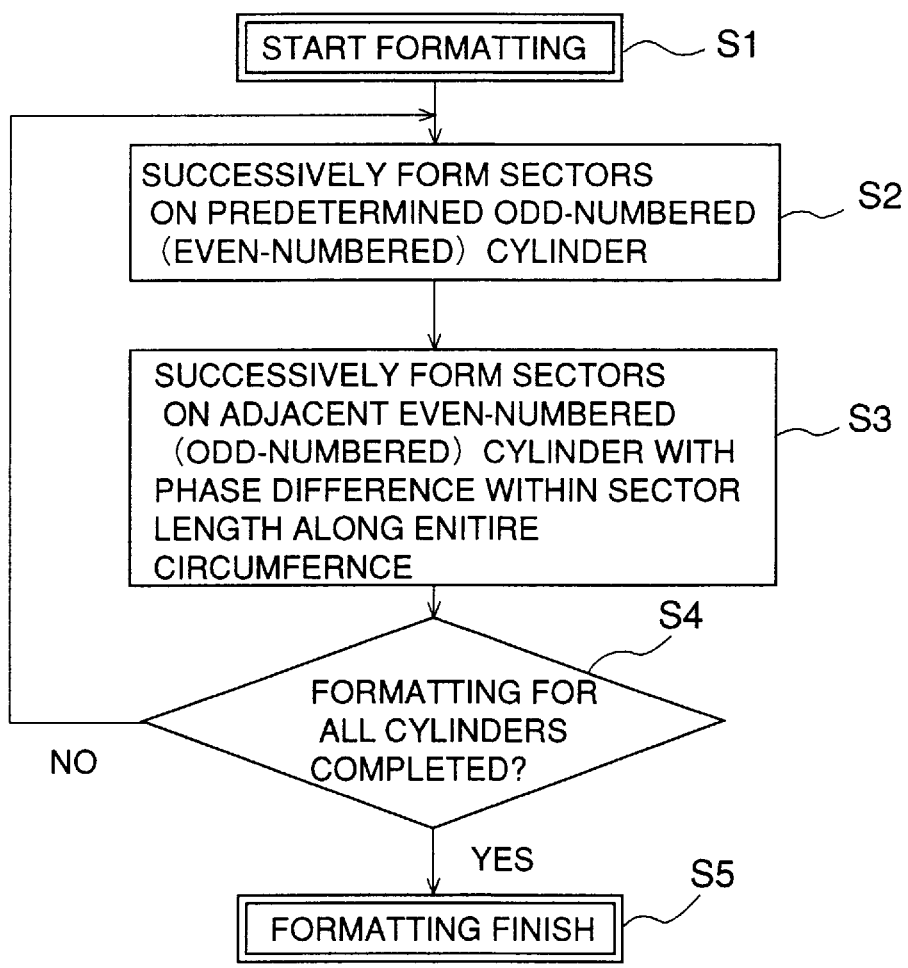
FIG. 6 shows a flowchart of disk formatting for the magnetic disk shown in FIG. 5.

In FIG. 6, when the formatting is started in a step S1 (hereinafter, the term 'step' being omitted), a predetermined number of sectors 32 are successively formed on a predetermined odd-numbered (or even-numbered) cylinder along the entire circumference thereof with a predetermined sector length for each sector, in S2. The same number of sectors 32 are then successively formed on an adjacent even-numbered (or odd-numbered) cylinder along the entire circumference thereof with the same predetermined sector length for each sector, in S3. The phase difference is provided between each sector formed in S2 and a respective sector formed in S3 and has a length of at least one byte within the sector length.

Thereby, along the entire circumference of each cylinder, the phase difference d1 is present between each of all the sectors on the odd-numbered cylinder and a respective one of all the sectors on the adjacent odd-numbered cylinder.

Then, the steps in S2 and S3 are repeated and thus performed on all the other cylinders of the magnetic disk 31 through repetitions of a loop of S2, S3 and S4. The sectors 32 formed on the odd-numbered cylinders have the same phase as each other, and the sectors 32 formed on the even-numbered cylinders have the same phase as each other. Along the entire circumference of each cylinder, the phase difference d1 is present between each of all the sectors on each odd-numbered cylinder and a respective one of all the sectors on any adjacent even-numbered cylinder. Thus, the formatting has been completed for all the cylinders of the magnetic disk 31, in S5.

Figure 7:
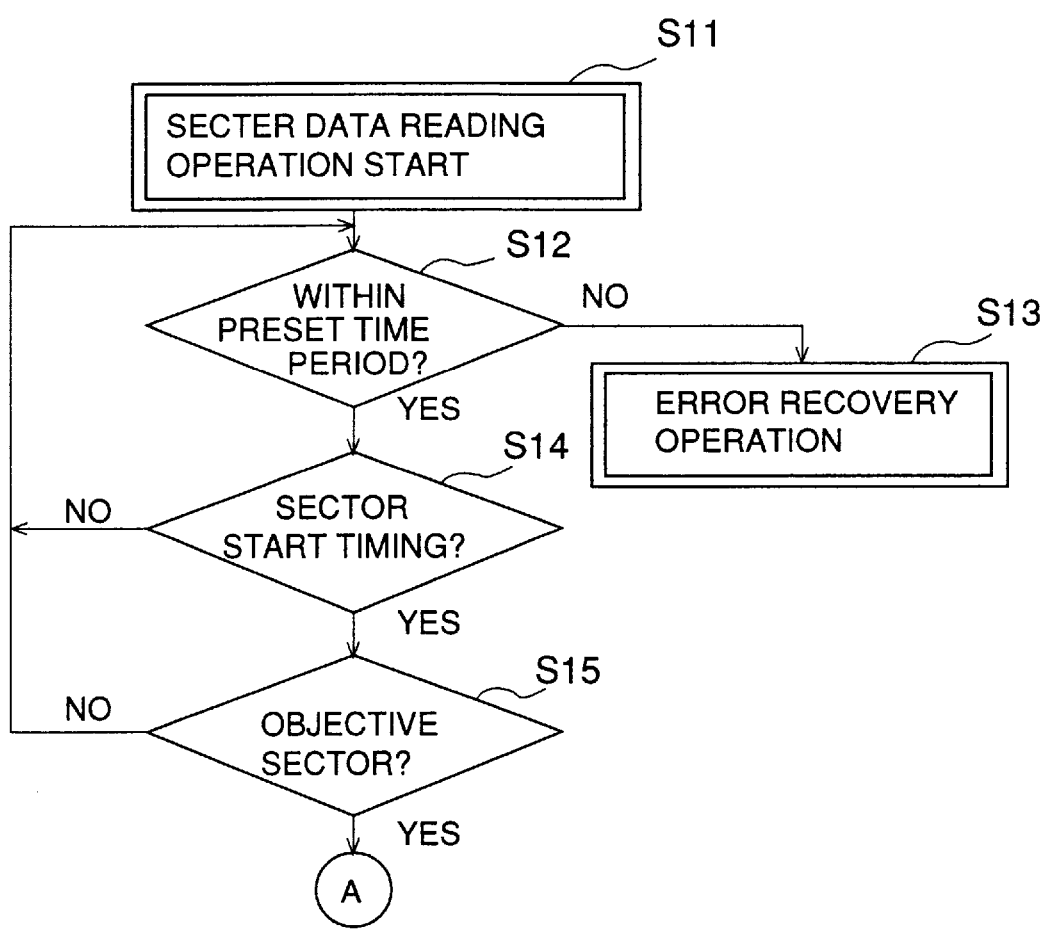
FIGS. 7, 8 and 9 show a flowchart of sector data reading for the magnetic disk shown in FIG. 5.
Figure 8:
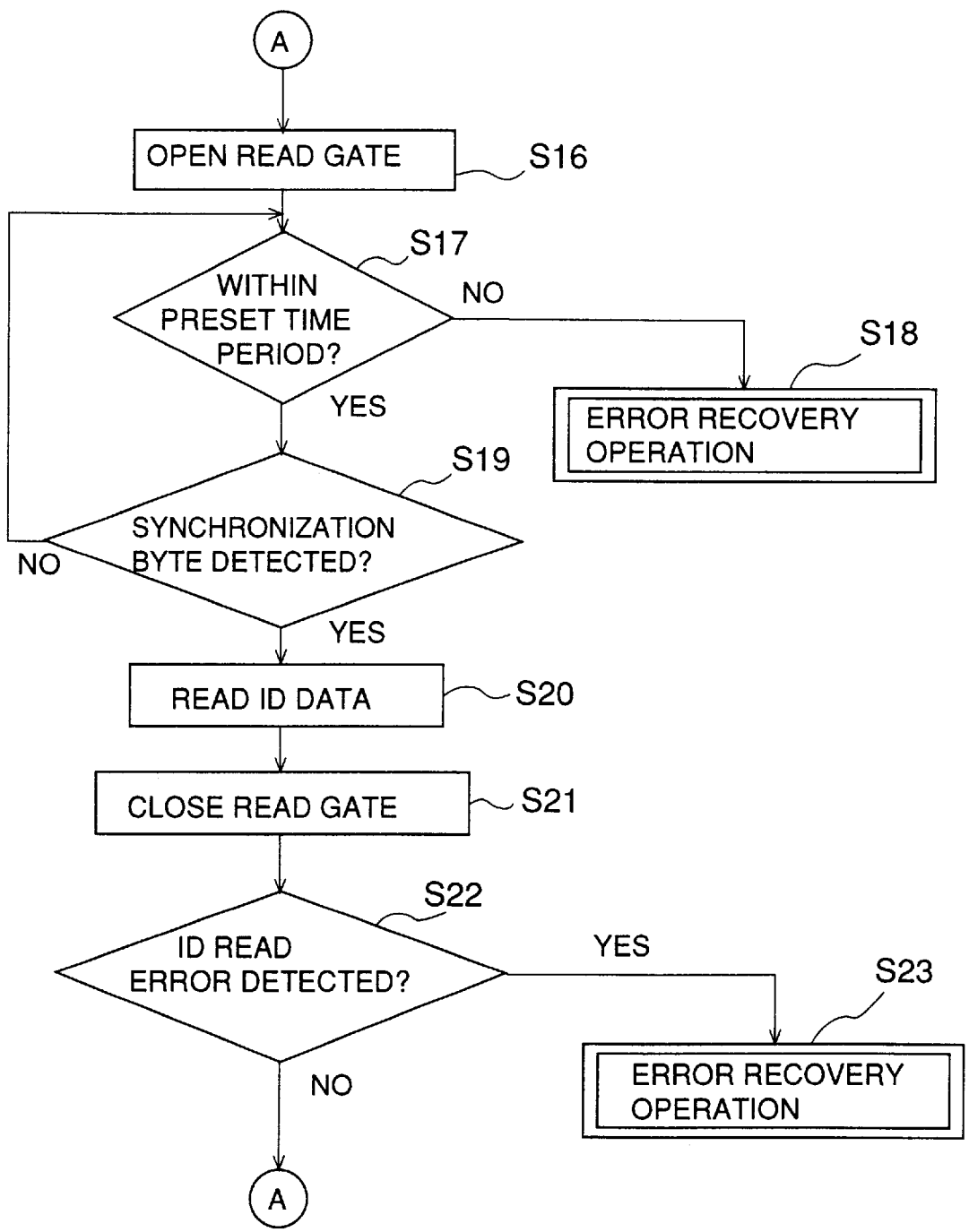
Figure 9:
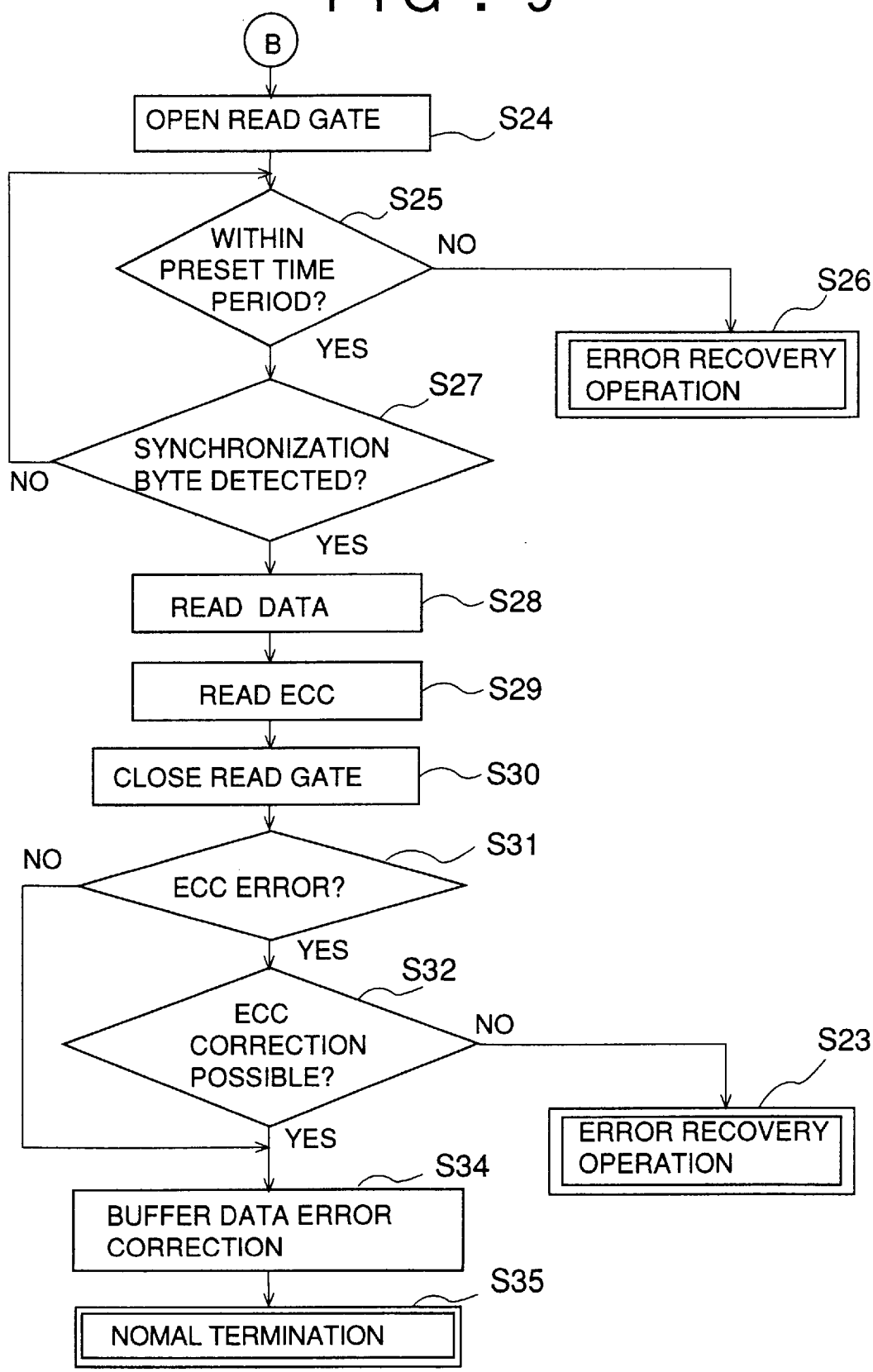

With reference to FIGS. 7, 8 and 9, reading of sector data from the magnetic disk 31 of the format shown in FIGS. 5A and 5B will now be described. In FIG. 7, when a sector reading command is supplied to the magnetic disk device 41 from the host computer 42 in S11, the magnetic disk device 41 starts measurement of a time period and determines whether the measured time period is within a preset time period in S12. If the measured time period is more than the preset time period, an error signal is generated and an error recovery operation such as a retrial operation is performed in S13. If the measured time period is not more than the preset time period, it is determined in S14 whether or not it is a sector start time. If it is the sector start time, the R/W head 51 is caused to seek to an objective cylinder and an objective sector is detected, in S15. In this case, for example, it is assumed that the objective cylinder is the odd-numbered cylinder shown in FIG. 5B and the objective sector is the sector containing DATA2 shown in the figure. These steps should be performed within the preset time period.

With reference to FIG. 8, when the R/W head 51 is positioned on the objective sector within the preset time period and a read gate open signal is generated by the MPU 46 in S16, measurement of a time period is started in S17. If it is determined in S17 that the measured time period has reached the preset time period, the error signal is generated and an error recovery operation such as a retrial operation is performed in S18. If the measured time period is within the preset time period, a synchronization byte detecting operation is performed in S19 and should be performed within the preset time period. The synchronization byte detecting operation includes turning on of a read circuit in the R/W circuit 50 and obtaining a synchronization pattern of a PLL circuit. Thus, it is determined whether or not the synchronization byte (not shown in FIG. 5B) which is previously recorded in front of the ID portion 32a in the sector 32 has been detected. This operation of a loop of S17 and S19 is repeated until it is determined that the synchronization byte has been detected within the preset time.

After the synchronization byte has been detected, data of the ID portion 32a is read in S20. After the reading of the data of the ID portion 32a has been completed, the read gate is closed in S21. Then, it is determined in S22 whether or not error is present in the read data of the ID portion. If an error has been detected in S22, an error recovery operation is perform in S23. The contents of the error may be data mismatching, an error resulting from a flag check, or a CRC (Cyclic Redundancy Check), or the like.

If no error has been detected in S22 shown in FIG. 8, the MPU 46 again generates the read gate open signal in S24 shown in FIG. 9. Similar to the above-mentioned operation, measuring of a time period is started, and it is determined whether the measured time period has reached a preset time period, in S25. If the measured time period has reached the preset time period, an error recovery operation is performed in S26. If the measured time has not reached the preset time, it is determined in S27 whether or not a synchronization byte (not shown in FIG. 5B) recorded in front of the data portion 32b has been detected. This operation is repeated until the synchronization byte has been detected within the preset time period. Data reading from the data portion 32b is performed after the synchronization byte has been detected and thus a predetermined number of bytes are held in the buffer 49 in S28. Further, ECC reading is performed and thus data is read from the ECC portion 32c in S29. When the ECC reading has been completed, the read gate is closed in S30.

In S31, it is determined whether or not an ECC error has been detected. An example case will now be considered in which the R/W head 51 is being used to read data of the data portion 32b, DATA2 of the sector 32 on the odd-numbered cylinder shown in FIG. 5B. Then, when the R/W head 51 passes through the servo region 33, the off-track phenomenon of the R/W head 51 occurs due to a cause such as vibration of the magnetic disk device 41. In such a case, the ECC error is detected in S31 shown in FIG. 9. Then, in S32, it is determined whether or not an ECC correction is possible.

In the above-described example, the R/W head 51 is completely positioned on the data portion 32b of the sector on the adjacent even-numbered cylinder having data DATA3 recorded therein. In this case, due to the phase difference d1, a number of bytes which the R/W head 51 has read from the data portion 32b at the position of the ECC portion start is different from, in this example smaller than, that in a case where the off-track phenomenon has not occurred and the R/W head 51 has read data DATA2 at the position of the ECC portion start. As a result, the position of the ECC portion is different from an expected one in the case of the off-track phenomenon occurring. Therefore, it is very likely that the ECC correction is not possible. In other words, it is likely that the ECC error detected in S31 is an error of a range in excess of an error correctable range. If so, S32 determines that the ECC correction is not possible. Then, an error recovery operation such as a retrial operation is performed in S33.

Thereby, even if DATA3 recorded on the even-numbered cylinder is similar to DATA2 recorded on the odd-numbered cylinder shown in FIG. 5B, due to the difference in the number of bytes read, it is very likely that a resulting ECC error is an error of a range in excess of an ECC error correctable range. Accordingly, it is possible to prevent an erroneous error correction from being performed. The erroneous error correction would have been performed if the resulting ECC error were an error of a range within the ECC error correctable range. Thus, it is possible to prevent read data destruction due to the erroneous error correction and improve data reliability.

Another example case will now be considered in which the off-track phenomenon occurring is such that the R/W head 51 is merely removed from a current track so slightly that the R/W head 51 is almost maintained on the current track and therefore a resulting ECC error is an error of a range within the ECC error correctable range. In this case, the ECC correction is performed and a data error of data held in the buffer 49 is corrected in S34. The read data including the corrected data which is held in the buffer 49 is then transferred to the host computer 42. Then, the current operation is normally terminated in S35. If no ECC error has been detected in S31, the read data held in the buffer 49 is transferred to the host computer 42. Then, the current operation is normally terminated in S35.

Figure 10A:
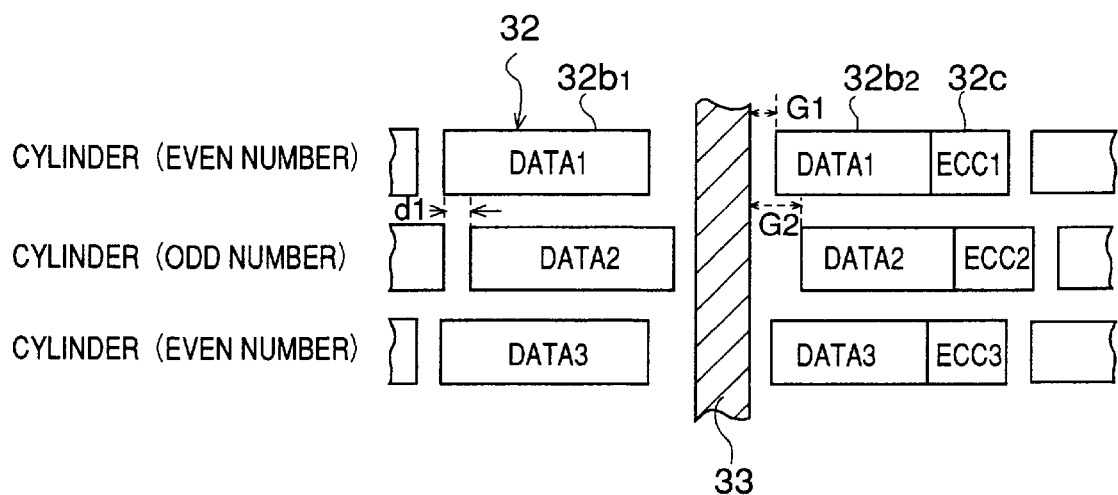
FIGS. 10A and 10B show other formats in magnetic disks in the first embodiment of the present invention.
Figure 10B:
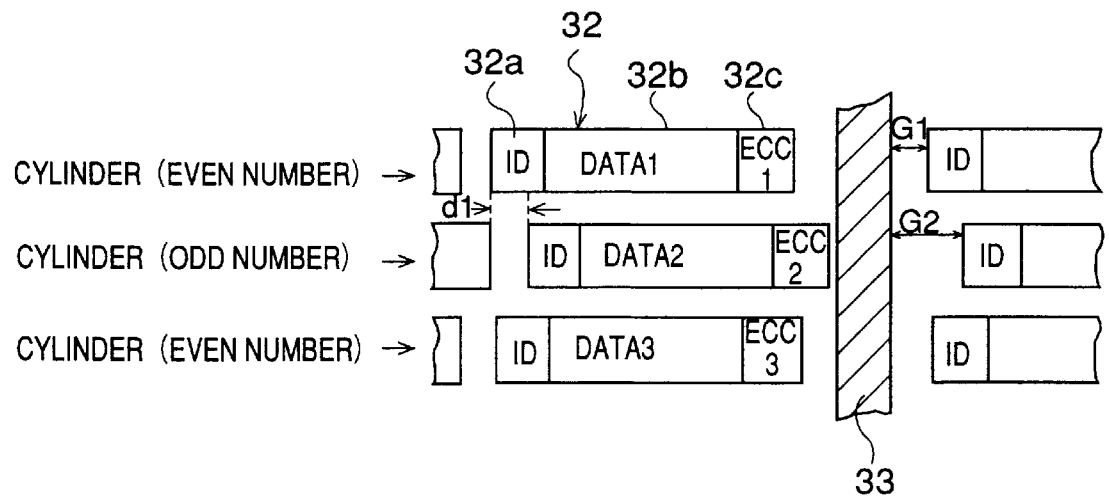

With reference to FIGS. 10A and 10B, disk format arrangements in the first embodiment will now be described. The arrangement shown in FIG. 10A results from omitting the ID portions 32a from the sectors 32 shown in FIG. 5B and is otherwise similar to that shown in FIG. 5B. Thus, the present invention can be applied whether or not the sectors 32 include ID portions 32a.

In the case shown in FIG. 10A, it may be assumed for example that the magnetic disk 31 is a 3.5-inch disk and is rotated at 3600 rpm and therefore one byte corresponds to 250 ns. In this assumption, if the number of servo frames is 64, a phase of the top of a sector 32 on an odd-numbered cylinder is delayed two bytes (corresponding to a 500-ns gate timing) from a phase of the top of a sector 32 on an even-numbered cylinder. Further, writing of a split data portion $32b_2$ on each even-numbered cylinder split by the servo region 33 is started at a position apart three bytes (delayed 750 ns) as a gap G1 shown in FIG. 10A from the rear end of the servo region 33. In comparison to this, writing of a split data portion $32b_2$ on each odd-numbered cylinder split by the servo region 33 is started at a position apart five bytes (delayed 1250 ns) as a gap G2 shown in the figure from the rear end of the servo region 33. Thereby, a two-byte phase difference is provided between the forward end of the split data portions $33b_2$.

FIG. 10B shows a case where the sectors 32 which include the ID portions 32a respectively in the odd-numbered and even-numbered cylinders are not split by the servo region 33 and the rear end of each sector 32 terminates in front of the servo region 33 as shown in the figure. Also in this case, a phase difference d1 within the sector length of each sector 32 is provided between the sectors 32 in the even-numbered cylinders and those in the odd-numbered cylinders. As a result, there is no sector in the even-numbered cylinders having the same phase as that of any sector in the off-numbered cylinders through the entirety of the cylinder circumference. Similar to the case shown in FIG. 10A, the phase difference d1 is two bytes and the gaps G2 and G1 between the front ends of the sectors and the servo region 33 are three bytes and five bytes, respectively.

Generally speaking, if the R/W head 51 reads servo information in the servo region 33, it is possible to determine, in use of the servo information, whether or not the R/W head 51 is in the off-track phenomenon. However, in the case where each sector 32 is not split by the servo region 33, it is not possible to determine, in use of the servo information, whether or not the R/W head 51 is in the off-track phenomenon. Therefore, by providing the phase difference d1 of the sectors 32 between the even-numbered and odd-numbered cylinders, it is possible to easily and surely detect a read error due to the off-track phenomenon.

The concept of the disk format arrangement shown in FIG. 10B can also be applied to a case where each sector 32 does not include an ID portion 32a such as that shown in FIG. 10A.

Thus, a phase difference within a sector length is provided between sectors 32 formed on adjacent cylinders respectively and thereby phases of the sectors on one cylinder physically are made to be different from those of the sectors on the adjacent cylinder through the entirety of the circumference of each cylinder. Thereby, if reading by the R/W head is performed on two sectors on adjacent cylinders, a resulting read error can surely be made to be one which it is not possible to correct. As a result, it is possible to prevent data destruction due to an erroneous correction and thus improve data reliability.

A direction of a phase difference between two sectors on even-numbered and odd-numbered cylinders is not limited to those described above. A spatial relationship between the sectors on the even-numbered cylinders and the sectors on the odd-numbered cylinders may be reverse to that shown FIG. 5B, 8A and 8B. This matter is similarly applied to embodiments which will be now described.

Figure 11A:
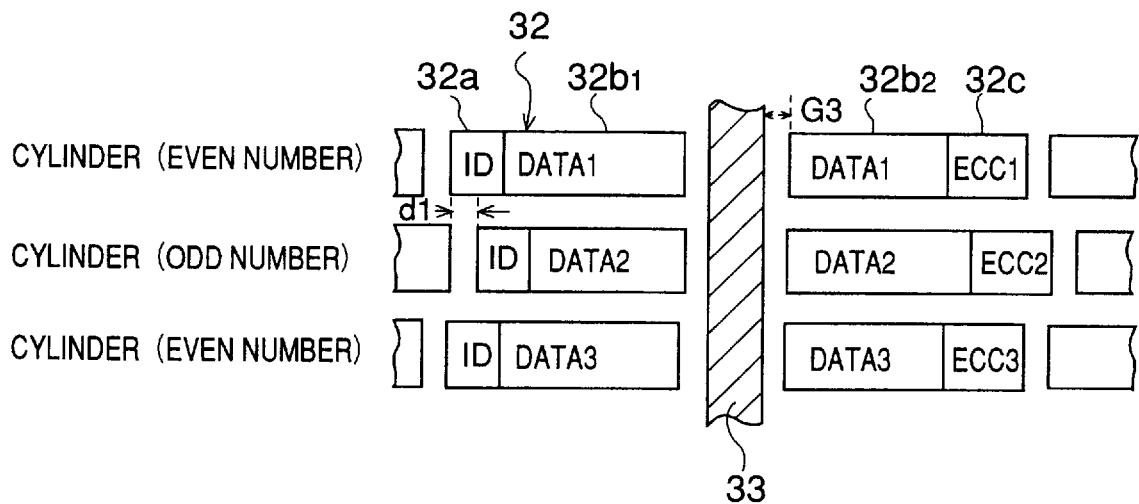
FIGS. 11A and 11B show formats in magnetic disks in a second embodiment of the present invention.
Figure 11B:
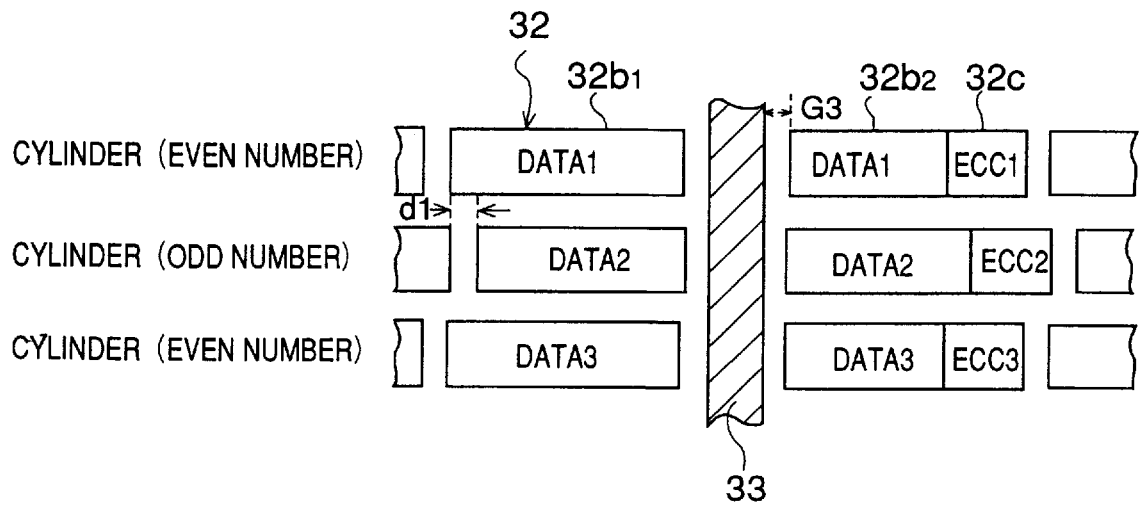

With reference to FIGS. 11A and 11B, disk format arrangements in a second embodiment of the present invention will now be described. In FIG. 11A, a data portion 32b ($32b_1$ and $32b_2$) of each sector 32 formed on the even-numbered and odd-numbered cylinders is spit by the servo region 33. As shown in FIG. 11A, a phase difference d1 (for example, of two bytes) is provided between the beginning (the top) of each sector 32 formed on the even-numbered cylinders and the beginning of a respective sector 32 formed on the odd-numbered cylinder. Further, all the sectors formed on the even-numbered cylinders are formed in identical phases among the different cylinders. Also, all the sectors formed on the odd-numbered cylinders are formed in identical phases among the different cylinders.

In the arrangement shown in FIG. 11A, split data portions $32b_2$ of the sectors 32 have the same gap G3 from the rear end of the servo region 33 among the different cylinders. Thereby, a ratio of a data length of a front split data portion $32b_1$ to a data length of a rear split data portion $32b_2$ on each odd-numbered cylinder is different, by a phase difference d1 (for example, of two bytes), from a ratio of a data length of a front split data portion $32b_1$ to a data length of a rear split data portion $32b_2$ on each even-numbered cylinder.

In the arrangement shown in FIG. 5B, gap lengths G1 and G2 are different, by an amount corresponding to the phase difference d1, between sectors on adjacent cylinders. In comparison to this, in the arrangement shown in FIG. 11A, the gap length G3 is identical among the adjacent cylinders as shown in FIG. 11A. Thereby, it is possible to make the gap length G3 be the minimum possible one and thereby a recording density in the magnetic disk can be improved.

The arrangement shown in FIG. 11B results from omitting the ID portions 32a from the sectors 32 shown in FIG. 11A and the other arrangement is similar to that shown in FIG. 11A. Thus, the present invention can be applied whether or not the sectors 32 include ID portions 32a.

Figure 12A:
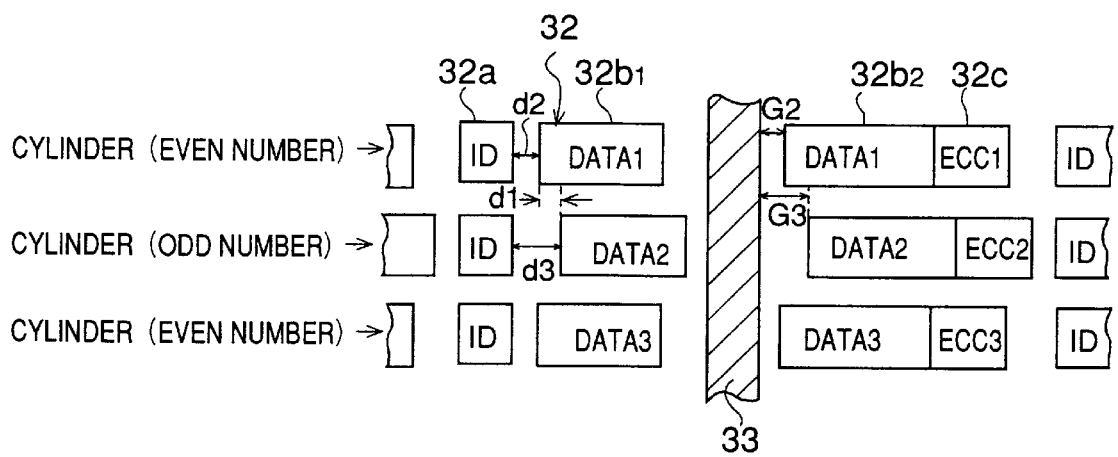
FIGS. 12A, 12B and 12C show formats in magnetic disks in a third embodiment of the present invention.
Figure 12B:
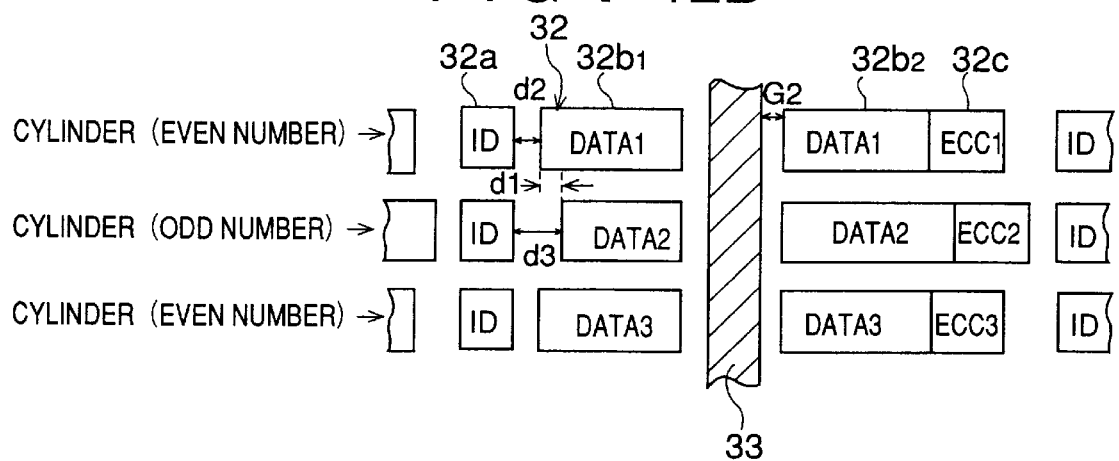
Figure 12C:
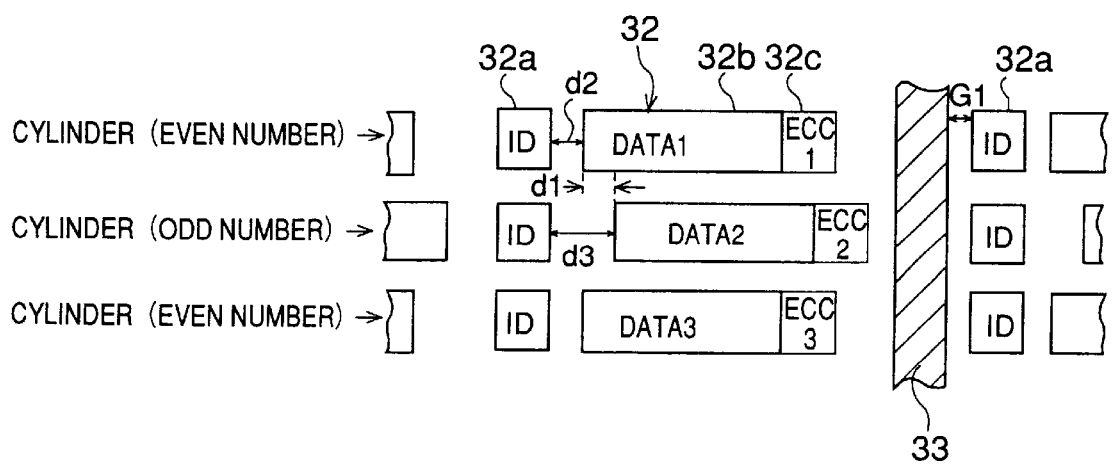

With reference to FIGS. 12A, 12B and 12C, disk format arrangements in a third embodiment of the present invention will now be described. In each of the three arrangements, each sector 32 formed includes an ID portion 32a and the ID portion 32a is separated by a predetermined gap from data portions 32b ($32b_1$ and $32b_2$) and an ECC portion 32c. In the arrangement shown in FIG. 12A, the beginning of the ID portion 32a of each sector 32 formed on each even-numbered cylinder is aligned with the beginning of the ID portion 32a of each sector 32 formed on each odd-numbered cylinder. In this arrangement, the beginning of the front split data portion $32b_1$ of each sector 32 formed on each even-numbered cylinder is different by a phase difference d1 having an amount within the sector length (data block length) from the beginning of the front split data portion $32b_1$ of each sector 32 formed on each odd-numbered cylinder.

Specifically, along the entirety of the cylinder circumference, all the data portions 32b ($32b_1$ and $32b_2$) of the formed sectors 32 have the phase difference d1 (for example, of two bytes) between each even-numbered cylinder and each odd-numbered cylinder. Therefore, if the front split data portion $32b_1$ of each even-numbered cylinder is separated by a gap d2 (for example, of three bytes) from the ID portion 32a thereof, the front split data portion $32b_1$ of each odd-numbered cylinder is separated by a gap d3 (for example, of five bytes) from the ID portion 32a thereof.

In the case of FIG. 12A, each data portion 32b is split by the servo region 33 into the front and rear split data portions $32b_1$ and $32b_2$. As shown in the figure, a gap G2 between the servo region 33 and the rear split data portion $32b_2$ on each even-numbered cylinder is for example three bytes which is different from a gap G3 between the servo region 33 and the rear split data portion $32b_2$ on each odd-numbered cylinder, the G3 being for example five bytes. This difference corresponds to the difference between the above-mentioned gaps d1 and d3.

Thus, the phases of data portions 32b ($32b_1$ and $32b_2$) of the sectors are different between each even-numbered cylinder and each odd-numbered cylinder. Thereby, if a data portion $32b_2$ of an adjacent cylinder is read by the R/W head 51 due to the off-track phenomenon of the R/W head 51, a resulting ECC error can be surely detected and also can be surely made to be one on which it is not possible to perform an ECC correction. As a result, it is possible to prevent data destruction due to an erroneous correction and thus improve data reliability.

The disk format arrangement shown in FIG. 12B is similar to that shown in FIG. 12A. However, as shown in FIG. 12B, a gap G3 between the beginning of each rear split data portion $32b_2$ and the servo region is uniform among the sectors on the even-numbered cylinders and odd-numbered cylinders. Further, a data length ratio between the front split data portion $32b_1$ and the rear split data portion $32b_2$ is different, by the phase difference d1, between a sector on each even-numbered cylinder and a sector on each odd-numbered cylinder. Thereby also, along the entirety of the cylinder circumference, all the data portions 32b ($32b_1$ and $32b_2$) of the formed sectors 32 have the phase difference d1 between each even-numbered cylinder and each odd-numbered cylinder. Thereby, similar to the arrangement shown in FIG. 11B, it is possible to make the gap length G3 be the minimum possible one and thereby a recording density in the magnetic disk can be improved.

In the arrangement shown in FIG. 12C, different from those shown in FIGS. 12A and 12B, each data portion 32b is not split into splits $32b_1$ and $32b_2$ by the servo region 33. Instead, as shown in FIG. 12C, each ECC portion 32c is terminated in front of the servo region 33 and the ID portion 32a of a subsequent sector starts in the rear of the servo region 33. In the arrangement shown in FIG. 12C, the phase difference d1 and the gaps d2 and d3 between ID portions 32a and data portions 32b are similar to those in the arrangement shown in FIGS. 12A and 12B. A gap G1 between the servo region 33 and each ID portion 32a in the rear of the servo region 33 is provided, for example, of three bytes. Advantages obtained from the arrangement shown in FIG. 12C are the same as those obtained from the arrangement shown in FIG. 10B.

With reference to FIG. 13, formatting of the disk format arrangements shown in FIGS. 12A, 12B and 12C will now be described.

In FIG. 13, when the formatting is started in S41, sectors 32 are successively formed on a predetermined odd-numbered (or even-numbered) cylinder along the entire cylinder circumference thereof in S42, each of the sectors 32 including an ID portion 32a which is separated from a data portion 32b ($32b_1$ and $32b_2$) of the same sector by, for example, three bytes (corresponding to 750 ns). Sectors 32 are then successively formed on an adjacent even-numbered (or odd-numbered) cylinder along the entire cylinder circumference thereof in S43. Each of the sectors 32 formed in S42 includes an ID portion 32a, the beginning of the ID portion 32a is aligned with the beginning of the ID portion 32a of a respective sector formed on the cylinder in S42, and the ID portion 32a of the sector 32 formed in S43 is separated from a data portion 32b ($32b_1$ and $32b_2$) of the same sector 32 by, for example, five bytes (corresponding to 1250 ns). Thereby, the phase difference d1 of two bytes (corresponding to 500 ns) in the example within the data block length (sector length) is present between each of all the sectors on the odd-numbered cylinder and a respective one of all the sectors on the adjacent even-numbered cylinder.

Then, the steps in S42 and S43 are repeated and thus performed on all the other cylinders of the magnetic disk 31 through repetitions of a loop of S42, S43 and S44. The data portions 32b ($32b_1$ and $32b_2$) of the sectors 32 formed on the odd-numbered cylinders have the same phase as each other. Similarly, the data portions 32b ($32b_1$ and $32b_2$) of the sectors 32 formed on the even-numbered cylinders have the same phase as each other. Thus, the formatting has been completed for all the cylinders of the magnetic disk 31, in S45.

Figure 14A:
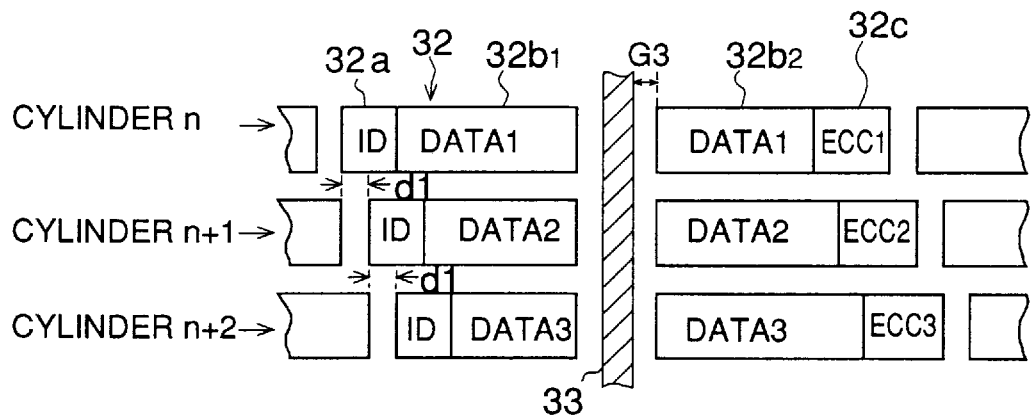
FIGS. 14A, 14B and 14C show formats in magnetic disks in a fourth embodiment of the present invention.
Figure 14B:
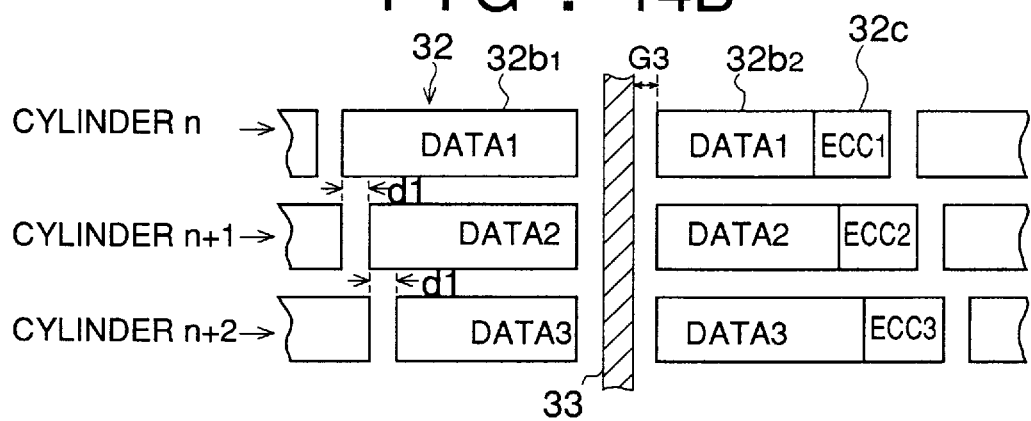
Figure 14C:
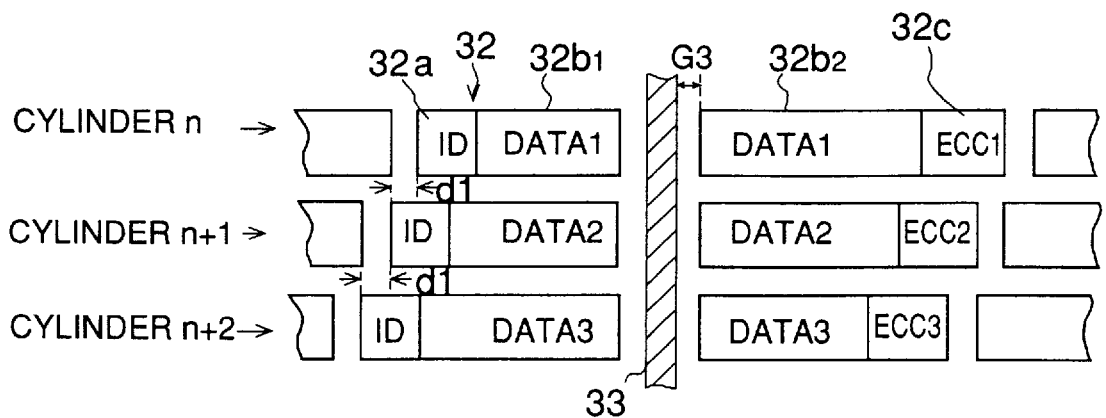

With reference to FIGS. 14A, 14B and 14C, disk format arrangements in a fourth embodiment of the present invention will now be described. In the arrangement shown in FIG. 14A, each sector includes an ID portion 32a, a data portion 32b ($32b_1$ and $32b_2$) and an ECC portion 32c. Phases of sectors 32 formed on each cylinder are different from those of sectors formed on any adjacent cylinder by a phase difference d1 (for example, of two bytes) within a sector length (a byte length of each sector), respectively, along the entire cylinder circumference. Thereby, there is no sector, which sector has a phase the same as that of any other sector, at least between adjacent cylinders, throughout all the cylinders. Further, it is preferable that there is no sector, which sector has a phase the same as that of any other sector, throughout all the cylinders.

In the arrangement shown in FIG. 14A, the data portion 32b of each sector 32 is split by the servo region 33 into the splits $32b_1$ and $32b_2$. A gap G3 (for example, of three bytes) between the servo region 33 and the rear split data portion $32b_2$ is uniform among the cylinders. As shown in the figure, a ratio between the front split data portion $32b_1$ and rear split data portion $32b_2$ is changed by an amount corresponding to the phase difference d1 as a cylinder is changed into an adjacent one, a cylinder n, a cylinder n+1, a cylinder n+2, . . . .

FIG. 14A shows a case where each sector 32 is split by the servo region 33. However, it is also possible to apply the same concept of the arrangement shown in FIG. 14A to a case where no sector 32 is split by the servo region, 33 and therefore the ECC portion 32c of each sector 32 is terminated in front of the servo region 33 and the ID portion 32a of a subsequent sector 32 starts in the rear of the servo region 33. However, in this case, a gap between the servo region 33 and an adjacent sector 32 is changed accordingly as a phase difference is changed due to a change of a cylinder.

Further, the phase difference d1 of sectors between adjacent cylinders is not necessary to be uniform as mentioned above. It is also possible that a phase difference is changed as cylinders are changed one by one. Further, it is also possible that a phase difference is changed as a preset block zone of cylinders is changed. Further, in the arrangement shown in FIG. 14A, a phase of a sector is delayed as a cylinder is changed in accordance with a cylinder number increasing. However, it is also possible that a phase of sector is advanced as a cylinder is changed in accordance with the cylinder number increasing, as in the arrangement shown in FIG. 14C. In the arrangement shown in FIG. 14C, the phase difference d1, for example, of two bytes between any adjacent cylinders is uniform.

The arrangement shown in FIG. 14B is similar to that shown in FIG. 14A. However, in the arrangement shown in FIG. 14B, the ID portion 32a is omitted from each sector 32 in each cylinder. Otherwise, arrangement is identical to those shown in FIG. 14A. In the arrangement shown in FIG. 14C, as mentioned above, a phase of a sector is advanced as a cylinder is changed in accordance with the cylinder number increasing. In the arrangement shown in FIG. 14C, the phase difference d1, for example, of two bytes between any adjacent cylinders is uniform. Also by using the arrangement shown in FIG. 14C, it is possible that phases of sectors 32 are different from each other throughout all the cylinders. In the arrangement shown in FIG. 14C, it is possible to omit the ID portion 32a from each sector. Similar to a case in the arrangement shown in FIG. 14A, it is possible, in each of the cases shown in FIGS. 14B and 14C, that a gap G3 (for example, of three bytes) between the servo region 33 and the rear split data portion $32b_2$ of each sector 32 is uniform throughout all the cylinders.

In the fourth embodiment of the present invention, a phase difference is successively provided at least between adjacent cylinders throughout all the cylinders. Thereby, similar to cases of other embodiments described above, it is possible to prevent an erroneous data correction in occurrence of the off-track phenomenon of the R/W head 51, thereby preventing data destruction and improving data reliability.

In the fourth embodiment described with reference to FIGS. 14A, 14B and 14C, basically, each sector 32 is split by a respective servo region 33. However, it is not necessary that each of all of the sectors 32 is split by a respective servo region 33. As long as the concept or philosophy of the fourth embodiment is used, it is possible that some sectors are included, each of which sectors is not split by any servo region 33. For example, it can be considered that in the arrangement shown in FIG. 14A, a phase of a sector 32 is further changed rearwardly by the phase difference d1, as a cylinder is further changed into a subsequent one, n+3, n+4, . . . . Then, the top of a sector 32 may be positioned in the rear of the servo region 33. In this case, the sector 32 is not split by the servo region 33.

Figure 15:
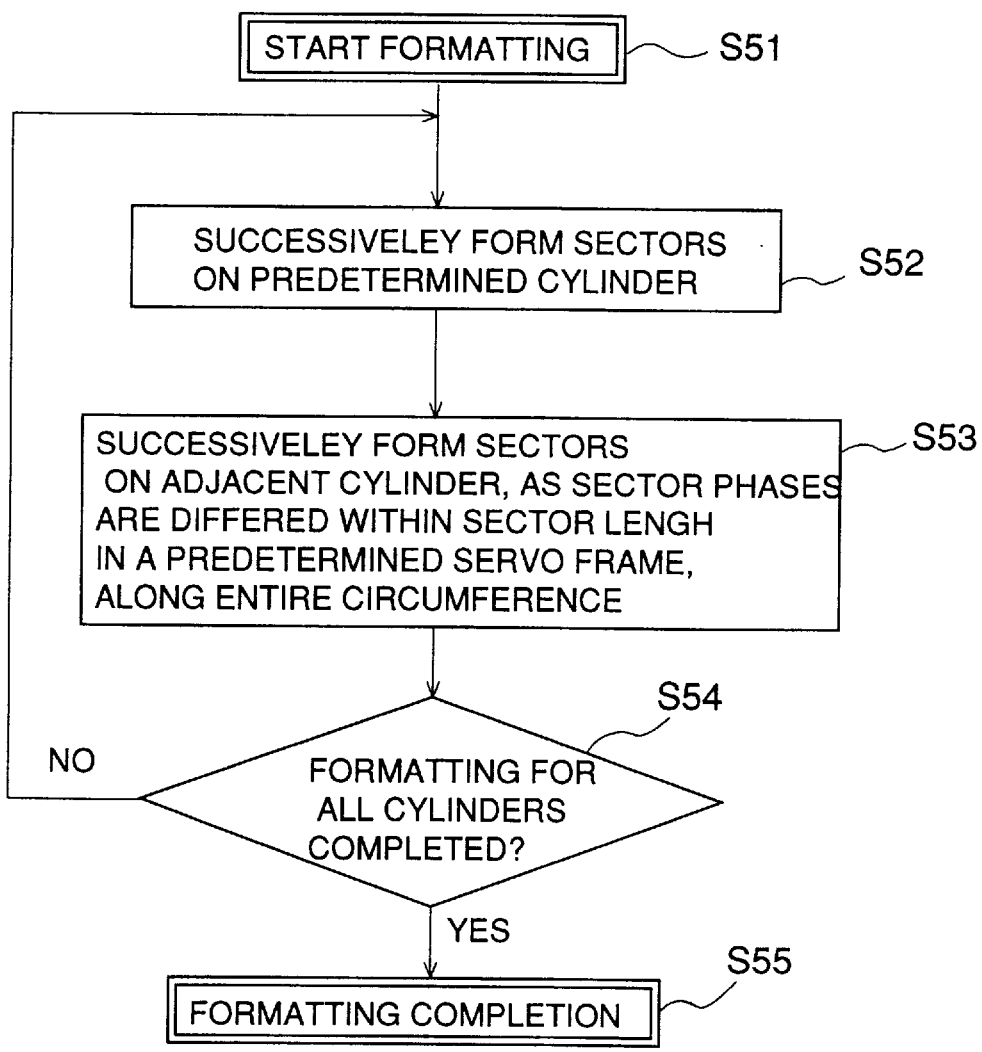
FIG. 15 shows a flowchart of disk formatting for the formats shown in FIGS. 14A, 14B and 14C.

With reference to FIG. 15, formatting of the arrangements shown in FIGS. 14A, 14B and 14C will now be described. When the formatting is started in S51, predetermined sectors 32 are successively formed on a predetermined cylinder (n), in S52. Each sector may or may not include the ID portion 32a. In a case where each sector is not split by the servo region 33 as mentioned above, appropriate timing for forming sectors is set such that phases of sectors are different among different cylinders in a manner in which a phase of a sector is delayed (or advanced) as a number of a cylinder increases. In case where each sector is split by the servo region 33 as shown in FIGS. 14A, 14B and 14C, the gap length G3 (for example, three bytes, corresponding to 750 ns) between the servo region 33 and each rear adjacent split sector (in the rear of the servo region 33) is uniform.

Then, in S53, sectors 32 are then successively formed on an adjacent cylinder (n+1) within a servo frame in a servo frame so that, through the entire cylinder circumference, the phase difference d1 (for example, of two bytes, corresponding to 500 ns) within a sector length (a byte length of each sector) is provided between each sector formed in S52 and a respective sector formed in S53. A loop of S52, S53 and S54 is repeated until the formatting of all the cylinders is completed. When the formatting of all the cylinders has been completed, the formatting is terminated in S55.

Figure 16A:
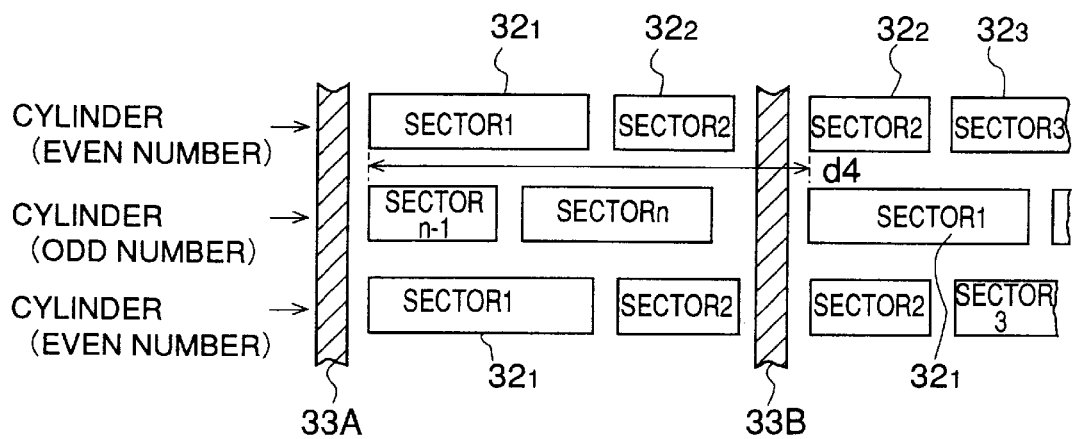
FIGS. 16A and 16B show formats in magnetic disks in a fifth embodiment of the present invention.
Figure 16B:
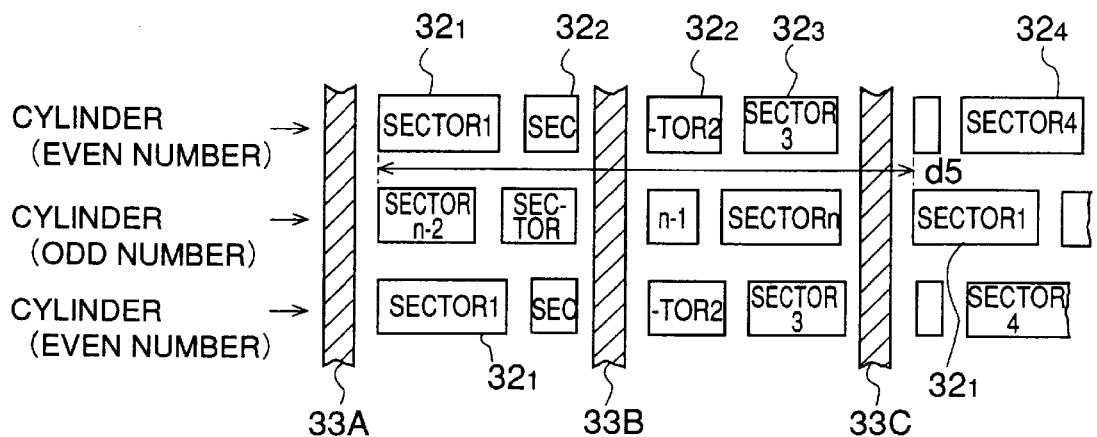

With reference to FIGS. 16A and 16B, disk format arrangements in a fifth embodiment of the present invention will now be described. In the arrangement shown in FIG. 16A, the magnetic disk 31 has, as mentioned above, a predetermined number of servo regions 33 formed thereon, which servo regions have servo information recorded therein. In the arrangement shown in FIG. 16A, the plurality of servo regions are a servo region 33A having servo information A recorded therein, a servo region 33B having servo information B recorded therein, a servo region 33C having servo information C recorded therein, . . . . Servo frames are provided between the servo regions 33A, 33B, 33C, . . . , respectively. In a condition similar to that described with reference to FIGS. 10A and 10B, a span of each servo frame is, for example, one which corresponds to a time period of 260 μs.

In the arrangement shown in FIG. 16A, a sector $32_1$ of each even-numbered cylinder is formed in use of a position of the servo region 33A as a reference position for the beginning of the sector $32_1$. Further, a sector $32_1$ of each odd-numbered cylinder is formed in use of a position of the servo region 33B as a reference position for the beginning of the sector $32_1$. Thereby, a phase difference d4 (corresponding to a delay of 260 μs) corresponding to a servo frame is provided between the top position of a sector 32 in each even-numbered cylinder and the beginning of the corresponding sector on each odd-numbered cylinder. As a result, phases of any corresponding sectors are not the same as each other between each even-numbered cylinder and each odd-numbered cylinder along the entirety of the cylinder circumference.

In the arrangement shown in FIG. 16B, a sector $32_1$ of each even-numbered cylinder is formed in use of a position of the servo region 33A as a reference position for the beginning of the sector $32_1$. Further, a sector $32_1$ of each odd-numbered cylinder is formed in use of a position of the servo region 33C as a reference position for the beginning of the sector $32_1$. Thereby, a phase difference d5 (corresponding to a delay of 520 μs, that is, twice 260 μs) is provided between the top position of a sector 32 in each even-numbered cylinder and the beginning of the corresponding sector on each odd-numbered cylinder. As a result, phases of any corresponding sectors are not the same as each other between each even-numbered cylinder and each odd-numbered cylinder along the entirety of the cylinder circumference. The arrangement shown in FIG. 16B is one example and it is also possible that a sector $32_1$ of each odd-numbered cylinder is formed in use of a position of a different servo region 33D, for example, as a reference position for the top of the sector $32_1$ in a condition where phases of any corresponding sectors are not the same as each other between each even-numbered cylinder and each odd-numbered cylinder along the entirety of the cylinder circumference.

When applying the concept of the fifth embodiment of the present invention, it does not matter whether or not an ID portion is included in each sector 32. Further, although FIG. 16A shows a case where a plurality of sectors are included in a single servo frame, the concept of the fifth embodiment can be similarly applied to a case where a single sector 32 has a sector length (sector byte length) longer than a plurality of servo frames. Further, numbers of sectors 32 such as sector 1, sector 2, sector 3, . . . , sector n−1 and sector n shown in FIGS. 16A and 16B do not indicate an order according to which data reading or writing is performed. These numbers of sectors 32 merely indicate patterns of the sectors starting from the sectors $32_1$ which act to indicate reference positions.

In the fifth embodiment of the present invention, as described above, phases of the sector $32_1$ acting to indicate reference positions are differed from each other by a distance corresponding to a length of one or a plurality of servo frames between each even-numbered cylinder and each odd-numbered cylinder. Thereby, phases of any corresponding sectors are not the same as each other between each even-numbered cylinder and each odd-numbered cylinder along the entirety of the cylinder circumference. As a result, similar to cases of other embodiments described above, it is possible to prevent an erroneous data correction in occurrence of the off-track phenomenon of the R/W head 51, thereby preventing data destruction and improving data reliability.

Figure 17:
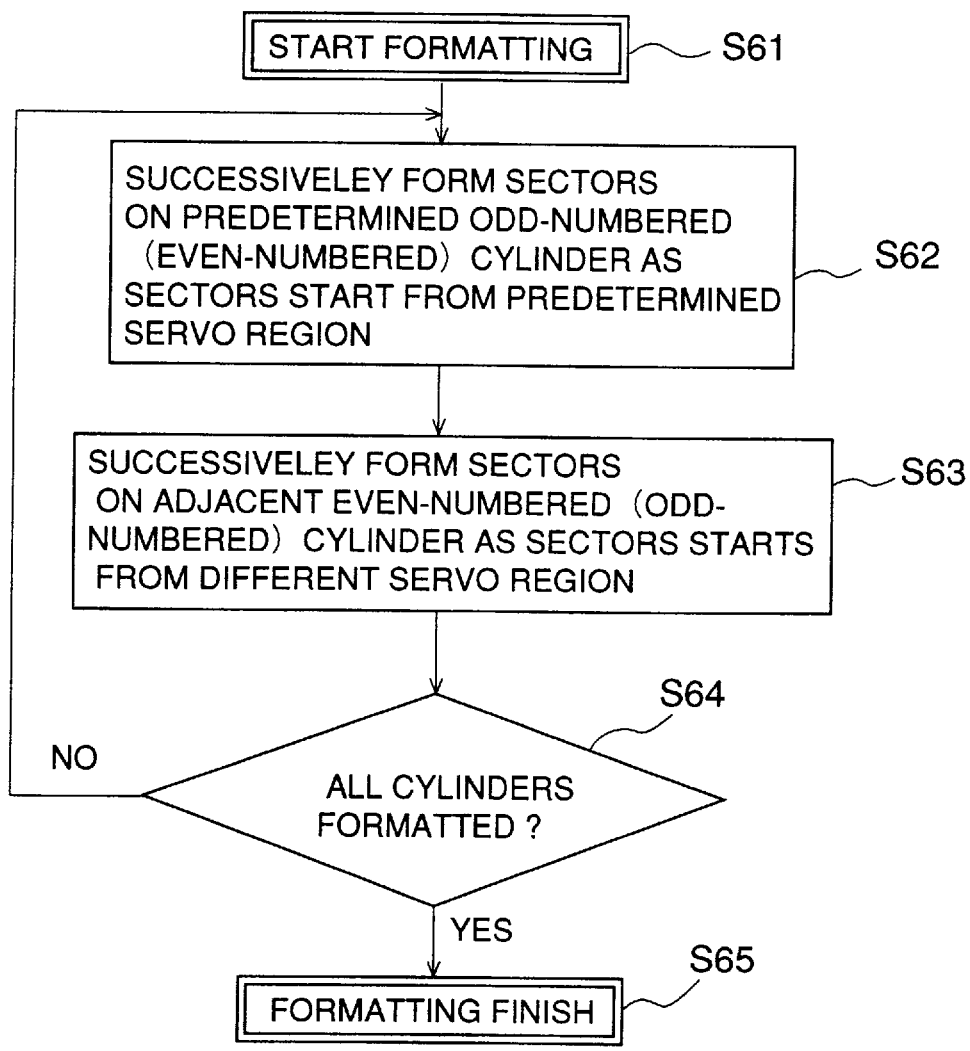
FIG. 17 shows a flowchart of disk formatting for the formats shown in FIGS. 16A and 16B.

With reference to FIG. 17, formatting of the disk format arrangements shown in FIGS. 16A and 16B will now be described. In FIG. 17, when the formatting is started in S61, sectors 32 are successively formed on a predetermined odd-numbered (or even-numbered) cylinder in S62. In the sector forming in S62, the beginning of the sector $32_1$ is positioned in used of a position of the servo region 33A as a reference position. Sectors 32 are then successively formed on an adjacent even-numbered (or odd-numbered) cylinder in S63. In the sector forming in S63, the beginning of the sector $32_1$ is positioned in use of a position of a different servo region, as a reference position, such as one of the servo regions 33B, 33C, . . . in use of gate timing delayed 260 μs (d4) or 520 μs (d5) for example.

Then, the steps in S62 and S63 are repeated and thus performed on all the other cylinders of the magnetic disk 31 through repetitions of a loop of S62, S63 and S64. Thereby, throughout all the cylinders, the servo regions used for obtaining the reference positions for positioning the sectors are different from each other between each odd-numbered cylinder and each even-numbered cylinder. Thus, the formatting has been completed for all the cylinders of the magnetic disk 31, in S65.

Figure 18A:
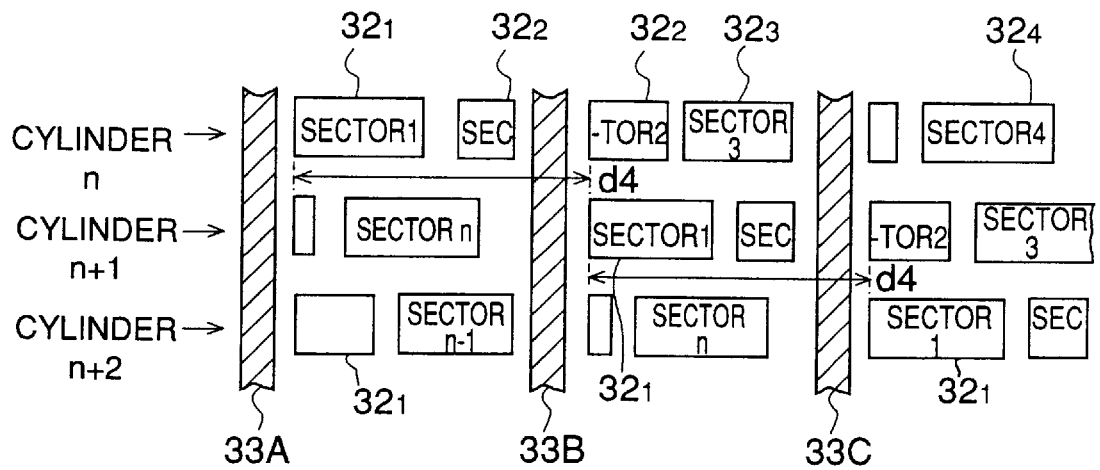
FIGS. 18A, 18B and 18C show formats in magnetic disks in a sixth embodiment of the present invention.
Figure 18B:
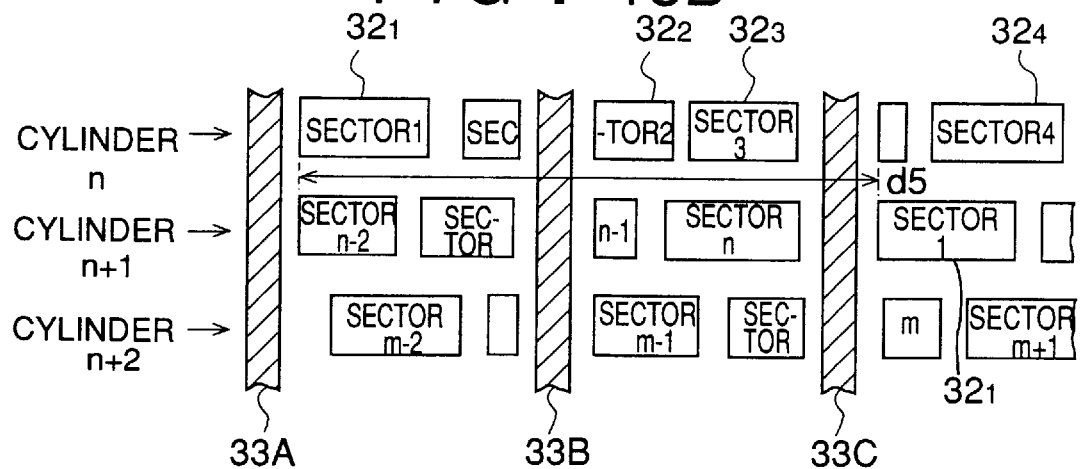
Figure 18C:
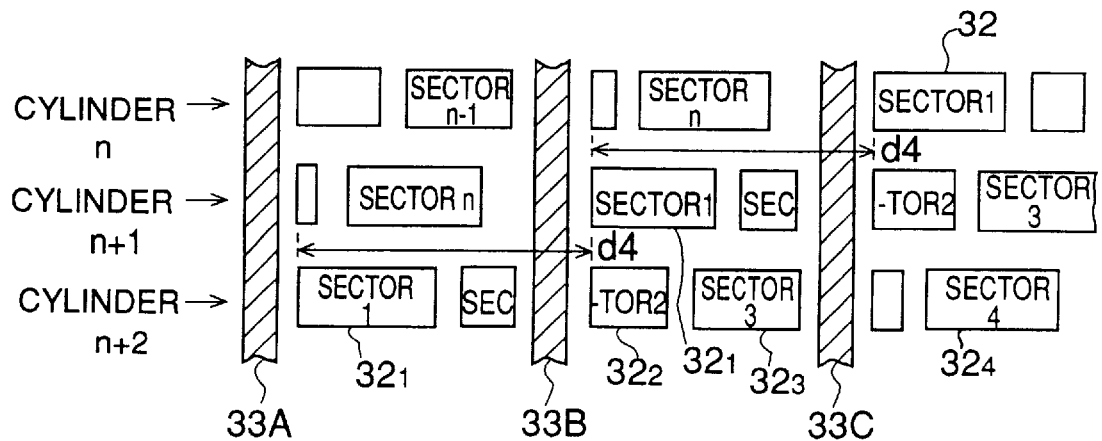

With reference to FIGS. 18A, 18B and 18C, disk format arrangements in a sixth embodiment of the present invention will now be described. Similar to the fifth embodiment described above, the servo regions 33A, 33B, 33C, . . . are formed on the magnetic disk 31 in the arrangements in the sixth embodiment. The servo regions 33A, 33B, 33C, . . . have the servo information A, B, C, . . . , respectively. In the arrangement shown in FIG. 18A, sectors are formed on cylinders of the magnetic disk 31 in a manner in which, for example, the beginning of a sector $32_1$ is formed on a cylinder n in use of the servo region 33A as a reference position, the beginning of a sector $32_1$ is formed on a cylinder n+1 in use of the servo region 33B as a reference position, the beginning of a sector $32_1$ is formed on a cylinder n+2 in use of the servo region 33C as a reference position, . . . . Thus, a servo region to be used as to indicate a reference position for the beginning of a sector $32_1$ is successively advanced as a number of a cylinder increases and thus a cylinder is changed to a subsequent adjacent one.

Thereby, throughout all the cylinders, there is no sector 32 which has a phase the same as that of any other sector 32 by successively positioning the beginning of each sector $32_1$ with a phase difference d4 corresponding to a servo frame (for example, corresponding to a time delay of 260 μs) between adjacent cylinders.

The phase difference of the sectors $32_1$ between adjacent cylinders is not limited to one corresponding to a servo frame. It is also possible that the phase difference of the sectors $32_1$ between adjacent cylinders corresponds to a plurality of servo frames. In the arrangement shown in FIG. 18B, the phase difference d5 of the sectors $32_1$ between adjacent cylinders corresponds to two servo frames (in the example, corresponding to a time delay of 520 μs). Thereby, throughout all the cylinders, along the entire cylinder circumference, there can be no case where phases of sectors are the same as each other.

In the arrangement shown in FIG. 18C, as a number of a cylinder increases and thus a cylinder is changed into a subsequent adjacent one, a servo region to be used as a reference position for the beginning of a reference sector $32_1$ is successively retreated by one or a plurality of servo frames, for example, 33C, 33B, 33A, . . . , by the phase difference d4 (for example, corresponding to a time delay of 260 μs). Thereby, throughout all the cylinders, along the entire cylinder circumference, there can be no case where phases of sectors are the same as each other.

In the sixth embodiment, as described above, a servo region to be used as a reference position for the top of a reference sector $32_1$ is successively changed forwardly or backwardly by one or a plurality of servo frames, corresponding to, for example, a time delay of one of 260 μs, 520 μs, . . . . Thereby, throughout all the cylinders, along the entire cylinder circumference, there can be no case where phases of sectors are the same as each other. As a result, similar to cases of other embodiments described above, it is possible to prevent an erroneous data correction in an occurrence of the off-track phenomenon of the R/W head 51, thereby preventing data destruction and improving data reliability. A structure of each sector 32 may be that in the fifth embodiment described above. Also in the case of the sixth embodiment, numbers of sectors 32 such as sector 1, sector 2, sector 3, . . . , sector n−1 and sector n shown in FIGS. 18A, 18B and 18C do not indicate an order according to which data reading or writing is performed. These numbers of sectors 32 merely indicate patterns of the sectors starting from the reference sectors $32_1$.

Figure 19:
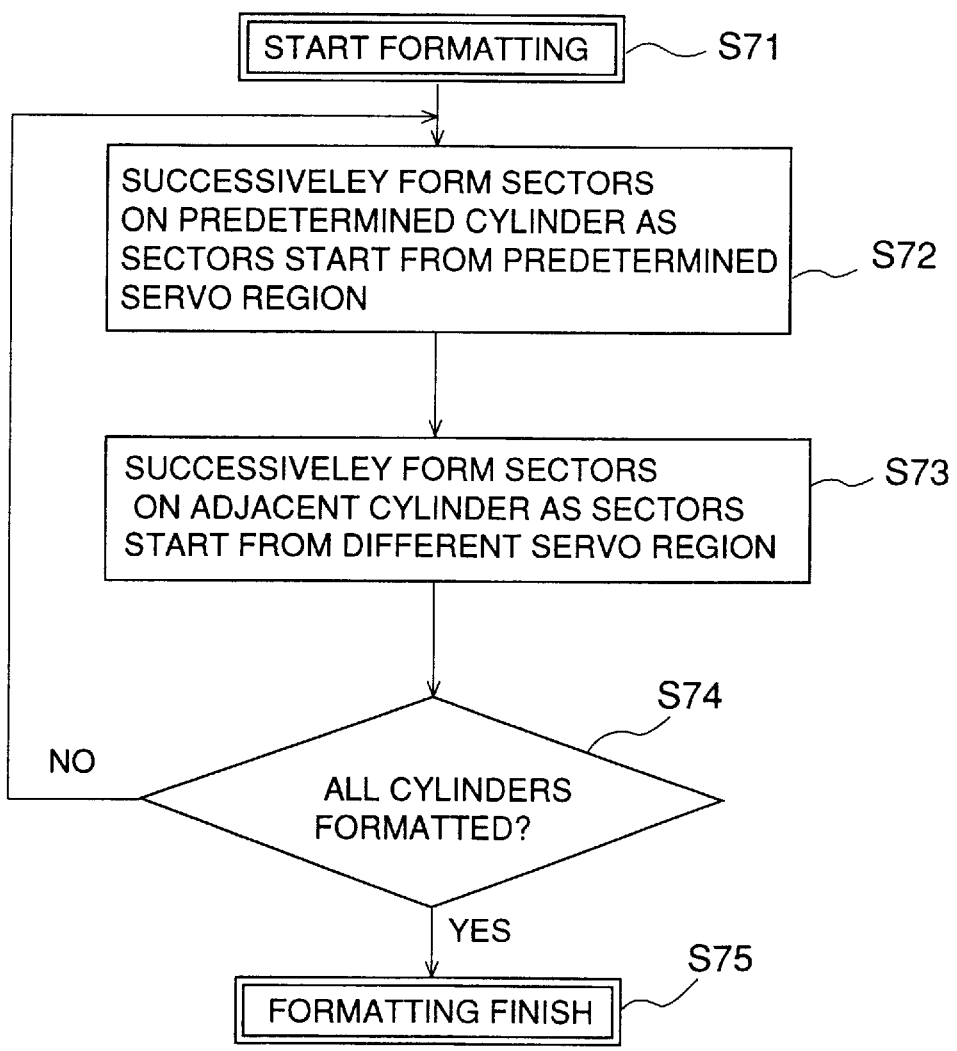
FIG. 19 shows a flowchart of disk formatting for the formats shown in FIGS. 18A, 18B and 18C.

With reference to FIG. 19, formatting of the arrangements shown in FIGS. 18A, 18B and 18C will now be described. In FIG. 19, when the formatting is started in S71, sectors 32 are successively formed on a predetermined cylinder (n) in S72. In the sector forming in S72, the top of the sector $32_1$ is positioned in used of a position of the servo region 33A as a reference position. Sectors 32 are then successively formed on an adjacent cylinder (n+1) in S73. In the sector forming in S73, the beginning of the sector $32_1$ is positioned in use of a position of a different servo region, as a reference position, such as one of the servo regions 33B, 33C, . . . , in use of gate timing being delayed 260 μs (d4) or 520 μs (d5), for example.

Then, the steps in S72 and S73 are repeated and thus performed on all the other cylinders of the magnetic disk 31 through repetitions of a loop of S72, S73 and S74. Thereby, throughout all the cylinders, a servo region used for obtaining the reference position for positioning the reference sector $32_1$ is successively differed as a cylinder is changed into a subsequent adjacent one. Thus, the formatting has been completed for all the cylinders of the magnetic disk 31, in S75.

In each of the above-described embodiments, basically, the lengths of ID portions (if they are included in the sectors, respectively) of the sectors are uniform throughout all the cylinders. Similarly, the lengths of data portions of the sectors are uniform throughout all the cylinders. Similarly, the lengths of ECC portions of the sectors are uniform throughout all the cylinders. However, application of the present invention is not limited to these conditions. The concept or philosophy of the present invention can also be applied to a case where the lengths of ID portions (if they are included in the sectors, respectively) of the sectors are not necessarily uniform through all the cylinders, the lengths of data portions of the sectors are not necessarily uniform throughout all the cylinders, and/or the lengths of ECC portions of the sectors are not necessarily uniform throughout all the cylinders.

The present invention is not limited to the above-described embodiments, and variations and modifications may be made without departing from the scope of the present invention.

Differing a position of a sector has been known from Japanese Laid-Open Patent Application Nos. 2-143957, 63-275075 and so forth. In the art disclosed in the Japanese Laid-Open Patent Application No. 2-143957, successive identification codes (ID) are given to sectors throughout cylinders and successive data reading and writing is performed on the sectors according to the successive identification codes. In this art, for a purpose of reducing a time required for a head to reach a sector on an adjacent cylinder, a phase of a sector on an adjacent cylinder is different by a distance corresponding to a time required for the head to move between adjacent cylinders. Specifically, in this art, when data reading and writing is successively performed on the sectors according to the successive identification codes between adjacent cylinders, a first sector on an adjacent cylinder is positioned backwardly with a phase difference corresponding to approximately a sector length. That is, a position of a first sector is shifted backwardly with respect to a disk rotation direction as a number of a cylinder increases.

In contrast to this, an object of the present invention is to prevent data destruction due to erroneous data correction in an occurrence of the off-track phenomenon. Therefore, in the present invention, regardless of successive identification codes of sectors, phases of all the sectors are not the same as each other between adjacent cylinders. For this purpose, a phase of each sector is different between each even-numbered cylinder and each odd-numbered cylinder or between all the cylinders forwardly or backwardly by a distance within a sector length or a distance of a predetermined number of servo frames. Thus, the object and arrangement of the present invention are different from those of the art disclosed in Japanese Laid-Open Patent Application No. 2-143957. Further, according to the disclosure in Japanese Laid-Open Patent Application No. 2-143957, even if a first sector on an adjacent cylinder is positioned with a phase difference longer than a sector length, there is a possibility that phases of sectors are the same as each other between adjacent cylinders. As a result, the problem in the related art, which the present invention has been made so as to solve, may occur in the art disclosed in Japanese Laid-Open Patent Application No. 2-143957.

Further, in the art disclosed in Japanese Laid-Open Patent Application No. 63-275075, similar to the art of Japanese Laid-Open Patent Application No. 2-143957, a phase of a first sector on a second track is different from a phase of a last sector on a first track by a distance corresponding to a time required for a head to move between adjacent tracks. Thereby, a time required for a head to reach a first sector on an adjacent track may be reduced. Therefore, there is a possibility that phases of sectors are the same as each other between adjacent tracks. As a result, data destruction due to erroneous data correction in an occurrence of the off-track phenomenon may occur in the art disclosed in Japanese Laid-Open Patent Application No. 63-275075.

As described above, in the present invention, phases of all the sectors are not the same as each other between adjacent cylinders. For this purpose, a phase of each sector is different between each even-numbered cylinder and each odd-numbered cylinder or between all the cylinders forwardly or backwardly by a distance within a sector length or a distance of a predetermined number of servo frames. Thereby, data destruction due to erroneous data correction in an occurrence of the off-track phenomenon can be prevented. Thus, the object and arrangement of the present invention are different from those of the art disclosed in Japanese Laid-Open Patent Application No. 63-275075.

What is claimed is:

1. A storage device in which a predetermined number of sectors are formed on respective predetermined cylinders of a predetermined recording medium, and a head is moved to and positioned at an objective sector of an objective cylinder so that information recording and/or reproducing is performed on said objective sector through said head, wherein a predetermined number of servo regions in which servo information is recorded therein are formed on said recording medium; and positions of all said sectors formed on said predetermined cylinders are such that a phase difference within a sector length is provided at least between adjacent cylinders, and said sectors are spaced from said servo regions.

2. The storage device according to claim 1, wherein said recording medium has one of a sector which includes a data portion in which information is to be stored, and a sector which includes the data portion and an ID portion formed thereon.

3. The storage device according to claim 1, wherein:

the sector lengths of the sectors formed on respective said cylinders of said recording medium are equal to each other;

a predetermined number of servo regions in which servo information is recorded therein are formed on said recording medium; and the phase difference is provided between the sector formed on an odd-numbered cylinder of said cylinders and the sector formed on an even-numbered cylinder of said cylinders.

4. The storage device according to claim 3, wherein, in the sector, which includes a data portion and an ID portion, the ID portion is separated from the data portion by a predetermined number of bytes; and the phase difference of the data portions of the sectors is provided between the adjacent cylinders.

5. The storage device according to claim 4, wherein;

in the sector, the data portion is split by the servo region; and a gap length between the servo region and the beginning of the split data portion on the odd-numbered cylinder is different from a gap length between said servo region and the beginning of the split data portion on the even-numbered cylinder.

6. The storage device according to claim 4, wherein;

in the sector, the data portion is split by the servo region; and a gap length between the servo region and the beginning of the split data portion on the odd-numbered cylinder is the same as a gap length between said servo region and the top of the split data portion on the even-numbered cylinder.

7. The storage device according to claim 1, wherein;

the sector is split by the servo region; and the phase difference is provided between the beginning of the sector formed on an odd-numbered cylinder of said cylinders and the beginning of the sector formed on an even-numbered cylinder of said cylinders.

8. The storage device according to claim 7, wherein a gap length between the servo region and the beginning of the split sector on the odd-numbered cylinder is different from a gap length between said servo region and the beginning of the split sector on the even-numbered cylinder.

9. The storage device according to claim 7, wherein a gap length between the servo region and the beginning of the split sector on the odd-numbered cylinder is the same as a gap length between said servo region and the beginning of the split sector on the even-numbered cylinder.

10. The storage device according to claim 4, wherein, in the sector, which includes a data portion and an ID portion, the ID portion is separated from the data portion by a predetermined number of bytes; and the phase difference of the data portions of the sectors is provided between the adjacent cylinders.

11. The storage device according to claim 10, wherein;

in the sector, the data portion is split by the servo region; and a gap length between the servo region and the beginning of the split data portion on the odd-numbered cylinder is different from a gap length between said servo region and the beginning of the split data portion on the even-numbered cylinder.

12. The storage device according to claim 10, wherein;

in the sector, the data portion is split by the servo region; and a gap length between the servo region and the beginning of the split data portion on the odd-numbered cylinder is the same as a gap length between said servo region and the beginning of the split data portion on the even-numbered cylinder.

13. A storage device which uses a predetermined number of recording media on which a predetermined number of sectors are formed on each cylinder of the recording media, and records information in and reproduces information from said recording media as a recording head is caused to move to and is positioned at an objective sector on an objective cylinder of said recording media; wherein a predetermined number of servo regions in which servo information is recorded are formed on said recording media said sectors being spaced from said servo regions; and a phase difference of the sectors is provided at least between adjacent cylinders, said phase difference being one of a forward one and a rearward one and having a length corresponding to a predetermined number of the servo region spans.

14. The storage device according to claim 13, wherein the phase difference of the sectors is provided between an odd-numbered cylinder and an even-numbered cylinder of said cylinders.

15. The storage device according to claim 13, wherein the phase difference of the sectors is provided between any cylinders of said cylinders.

16. A storage device which uses a recording medium on which a predetermined number of sectors are formed on each cylinder of said recording medium, and records information in and reproduces information from said recording medium as a recording head is caused to move to and is positioned at an objective sector on an objective cylinder of said recording medium; wherein a predetermined number of servo regions in which servo information is recorded are formed on said recording media, said sectors being spaced from said servo regions and, every sector formed on a predetermined cylinder of said recording medium is formed so that a phase difference is provided between any different cylinders, said phase difference being either a forward one and a rearward one and having a length within a sector length.

17. The storage device according to claim 16, wherein said recording medium includes one of a sector which includes a data portion in which information to be stored is recorded, and a sector which includes the data portion and an ID portion.

18. A formatting method in which a predetermined number of sectors are formed on each cylinder of a recording medium, said method comprising the steps of:

a) successively forming the predetermined number of sectors on a predetermined cylinder;

b) successively forming the predetermining number of sectors on an adjacent cylinder with a phase difference within a sector length;

c) successively forming the predetermined number of sectors on each of all the other cylinders so that a phase difference within the sector length is provided between any adjacent cylinders; and d) forming a predetermined number of servo regions in which servo information is recorded on said recording media said sectors being spaced from said servo regions.

19. The formatting method according to claim 18, wherein;

in the sector, an ID portion in which a sort of information which is used for recording information to be stored is recorded, said ID portion being distant from a data portion in which the information to be stored is recorded; and the phase difference is provided at least between the data portions between adjacent cylinders.

20. The formatting method according to claim 18, wherein;

said cylinders are classified into odd-numbered cylinders and even-numbered cylinders, said odd-numbered cylinders being adjacent to said even-numbered cylinders respectively; and the beginning of each odd-numbered cylinder has the same phase as that of the beginning of any other odd-numbered cylinder, and the beginning of each even-numbered cylinder has the same phase as that of the beginning of any other even-numbered cylinder.

21. The formatting method according to claim 18, wherein the phase difference is one of a forward one or a rearward one.

22. A formatting method in which a predetermined number of sectors are formed on each cylinder of a recording medium, and a predetermined number of servo regions in which servo information is recorded are formed; said method comprising the steps of:

a) successively forming the predetermined number of sectors on a predetermined cylinder;

b) successively forming the predetermined number of sectors on an adjacent cylinder with a phase difference of a distance corresponding to a predetermined number of the servo region spans from the sectors formed in said step a) respectively; and c) successively forming the predetermined number of sectors on all the other cylinders so that a phase difference in the sectors of a distance corresponding to a predetermined number of servo region spans is provided between any adjacent cylinders said sectors being spaced from said servo regions.

23. The formatting method according to claim 22, wherein:

said cylinders are classified into odd-numbered cylinders and even-numbered cylinders, said odd-numbered cylinders being adjacent to said even-numbered cylinders respectively; and the beginning of each odd-numbered cylinder has the same phase as that of the beginning of any other odd-numbered cylinder, and the beginning of each even-numbered cylinder has the same phase as that of the beginning of any other even-numbered cylinder.

24. The formatting method according to claim 22, wherein the phase difference is either a forward one and a rearward one.

25. A storage device in which a predetermined number of sectors are formed on respective predetermined cylinders of a predetermined recording medium, and a head is moved to and positioned at an objective sector of an objective cylinder so that information recording and/or reproducing is performed on said objective sector through said head, wherein a predetermined number of servo regions in which servo information is recorded therein are formed on said recording medium; and positions of all said sectors formed on said predetermined cylinders are such that a phase difference within a sector length is provided at least between adjacent cylinders, the sectors being split by the servo region; and the phase difference being provided between the beginning of the sector formed on an odd-numbered cylinder of said cylinders and the beginning of the sector formed on an even-numbered cylinder of said cylinders.

26. The storage device according to claim 25, wherein a gap length between the servo region and the beginning of the split sector on the odd-numbered cylinder is different from a gap length between said servo region and the beginning of the split sector on the even-numbered cylinder.

27. The storage device according to claim 25, wherein a gap length between the servo region and the beginning of the split sector on the odd-numbered cylinder is the same as a gap length between said servo region and the beginning of the split sector on the even-numbered cylinder.

28. The storage device according to claim 25, wherein within the sectors, an ID portion is separated from the data portion by a predetermined number of bytes; and the phase difference of the data portions of the sectors is provided between the adjacent cylinders.

29. The storage device according to claim 28, wherein within the sectors, the data portion is split by the servo region; and a gap length between the servo region and the beginning of the split data portion on the odd-numbered cylinder is different from a gap length between said servo region and the beginning of the split data portion on the even-numbered cylinder.

30. The storage device according to claim 28, wherein within the sectors, the data portion is split by the servo region; and a gap length between the servo region and the beginning of the split data portion on the odd-numbered cylinder is the same as a gap length between said servo region and the beginning of the split data portion on the even-numbered cylinder.

31. A storage device in which a predetermined number of sectors are formed on respective predetermined cylinders of a predetermined recording medium, and a head is moved to and positioned at an objective sector of an objective cylinder so that information recording and/or reproducing is performed on said objective sector through said head, wherein a predetermined number of servo regions in which servo information is recorded therein are formed on said recording medium; and positions of all said sectors formed on said predetermined cylinders are such that a phase difference within a sector length is provided at least between adjacent cylinders;

the sector lengths of the sectors formed on respective said cylinders of said recording medium are equal to each other;

the phase difference is provided between the sector formed on an odd-numbered cylinder of said cylinders and the sector formed on an even-numbered cylinder of said cylinders;

wherein, within the sectors, an ID portion is separated from the data portion by a predetermined number of bytes; and the phase difference of the data portions of the sectors is provided between the adjacent cylinders.

32. The storage device according to claim 31, wherein within the sectors, the data portion is split by the servo region; and a gap length between the servo region and the beginning of the split data portion on the odd-numbered cylinder is different from a gap length between said servo region and the beginning of the split data portion on the even-numbered cylinder.

33. The storage device according to claim 31, wherein within the sectors, the data portion is split by the servo region; and a gap length between the servo region and the beginning of the split data portion on the odd-numbered cylinder is the same as a gap length between said servo region and the beginning of the split data portion on the even-numbered cylinder.

34. A formatting method in which a predetermined number of sectors are formed on each cylinder of a recording medium, said method comprising the steps of:
- a) successively forming the predetermined number of sectors on a predetermined cylinder;
- b) successively forming the predetermining number of sectors on an adjacent cylinder with a phase difference within a sector length; and
- c) successively forming the predetermined number of sectors on each of all the other cylinders so that a phase difference within the sector length is provided between any adjacent cylinders; wherein
    - d) within the sectors, an ID portion in which a sort of information which is used for recording information to be stored is recorded, said ID portion being distant from a data portion in which the information to be stored is recorded; and
    - e) the phase difference is provided at least between the data portions between adjacent cylinders.

35. A formatting method in which a predetermined number of sectors are formed on each cylinder of a recording medium, and a predetermined number of servo regions in which servo information is recorded are formed said method comprising the steps of:
- a) successively forming the predetermined number of sectors on a predetermined cylinder;
- b) successively forming the predetermined number of sectors on an adjacent cylinder with a phase difference of a distance corresponding to a predetermined number of the servo region spans from the sectors formed in said step a) respectively; and
- c) successively forming the predetermined number of sectors on all the other cylinders so that a phase difference in the sectors of a distance corresponding to a predetermined number of servo region spans is provided between any adjacent cylinders wherein
    - d) said cylinders are classified into odd-numbered cylinders and even-numbered cylinders, said odd-numbered cylinders being adjacent to said even-numbered cylinders respectively; and
    - e) the beginning of each odd-numbered cylinder has the same phase as that of the beginning of any other odd-numbered cylinder, and the beginning of each even-numbered cylinder has the same phase as that of the beginning of any other even-numbered cylinder.

\* \* \* \* \*

UNITED STATES PATENT AND TRADEMARK OFFICE
CERTIFICATE OF CORRECTION

PATENT NO. : 5,838,511
DATED : November 17, 1998
INVENTOR(S) : Keiichi Haraya

It is certified that error appears in the above-identified patent and that said Letters Patent is hereby corrected as shown below:

Column 5, line 54, delete "top" and insert

--beginning-- therefor

Column 8, line 58, delete "32b," and insert

--32b$_1$-- therefor

Column 21, line 34, delete "4" and insert

--7-- therefor

Signed and Sealed this

Twenty-first Day of December, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,838,511
DATED : November 17, 1998
INVENTOR(S) : Keiichi Haraya

It is certified that error appears in the above-identified patent and that said Letters Patent is hereby corrected as shown below:

Column 21, line 16, delete "top" and insert --beginning-- therefor

Signed and Sealed this

Fourteenth Day of March, 2000

Attest:

Q. TODD DICKINSON

*Attesting Officer*          *Commissioner of Patents and Trademarks*